(12) United States Patent
Yano et al.

(10) Patent No.: US 12,422,316 B2
(45) Date of Patent: Sep. 23, 2025

(54) WATER PRESSURE FLUCTUATION MEASURING SYSTEM AND WATER PRESSURE FLUCTUATION MEASURING METHOD

(71) Applicant: NEC Corporation, Tokyo (JP)

(72) Inventors: Yutaka Yano, Tokyo (JP); Eitaro Misumi, Tokyo (JP)

(73) Assignee: NEC CORPORATION, Tokyo (JP)

(*) Notice: Subject to any disclaimer, the term of this patent is extended or adjusted under 35 U.S.C. 154(b) by 491 days.

(21) Appl. No.: 17/795,966

(22) PCT Filed: Jan. 19, 2021

(86) PCT No.: PCT/JP2021/001729
§ 371 (c)(1),
(2) Date: Jul. 28, 2022

(87) PCT Pub. No.: WO2021/157345
PCT Pub. Date: Aug. 12, 2021

(65) Prior Publication Data
US 2023/0073833 A1 Mar. 9, 2023

(30) Foreign Application Priority Data

Feb. 6, 2020 (JP) .................................. 2020-018851

(51) Int. Cl.
*G01L 1/24* (2006.01)
*G01L 11/02* (2006.01)

(52) U.S. Cl.
CPC ................ *G01L 1/24* (2013.01); *G01L 11/02* (2013.01)

(58) Field of Classification Search
CPC ....................................................... G01L 11/02
(Continued)

(56) References Cited

U.S. PATENT DOCUMENTS

| 3,860,900 A | 1/1975 | Scudder |
| 5,649,035 A * | 7/1997 | Zimmerman ......... G01B 11/18 385/13 |

(Continued)

FOREIGN PATENT DOCUMENTS

| JP | H0486510 A * | 3/1992 |
| JP | H08-14952 A | 1/1996 |

(Continued)

OTHER PUBLICATIONS

Translation of JP-H0486510-A (Year: 1992).*

(Continued)

*Primary Examiner* — Nathaniel T Woodward

(57) ABSTRACT

A water pressure fluctuation measuring system detects a water pressure fluctuation. A cable, which includes an optical fiber, is provided on or in the ground of the seabed in such a way that the optical fiber is expanded and contracted according to the water pressure fluctuation. An optical output unit outputs monitoring light to the optical fiber. A partial reflection unit is provided on a path of the optical fiber in the cable and partially reflects the monitoring light. An optical reception unit receives reflection light reflected by the partial reflection unit. A calculation unit measures a length of the optical fiber to the partial reflection unit, based on a round-trip propagation time of the received reflection light, and monitors a change of the length over time.

16 Claims, 31 Drawing Sheets

(58) Field of Classification Search
USPC .......................................................... 73/800
See application file for complete search history.

(56) References Cited

U.S. PATENT DOCUMENTS

| | | | | |
|---|---|---|---|---|
| 5,757,487 | A | * | 5/1998 | Kersey ............... G01D 5/35383 356/478 |
| 2018/0149528 | A1 | * | 5/2018 | Hull ........................ G01K 1/20 |
| 2018/0216979 | A1 | | 8/2018 | Ainger |

FOREIGN PATENT DOCUMENTS

| | | | | |
|---|---|---|---|---|
| JP | H08-128869 | A | | 5/1996 |
| JP | 2586838 | B2 | | 3/1997 |
| JP | 09210740 | A | * | 8/1997 |
| JP | H09-210740 | A | | 8/1997 |
| JP | 2906232 | B1 | | 6/1999 |
| JP | 3391341 | B2 | | 3/2003 |
| JP | 3440721 | B2 | | 8/2003 |
| JP | 3509748 | B2 | | 3/2004 |
| JP | 3653550 | B2 | | 5/2005 |
| JP | 2007-518365 | A | | 7/2007 |
| JP | 4187866 | B2 | | 11/2008 |
| JP | 2012063146 | A | * | 3/2012 |
| WO | 2020/203373 | A1 | | 10/2020 |

OTHER PUBLICATIONS

Translation of JP-2012063146-A (Year: 2012).*
Translation of JP-09210740-A (Year: 1997).*
International Search Report for PCT Application No. PCT/JP2021/001729, mailed on Mar. 2, 2021.
Keiichi Tadokoro, "Observation of seafloor crustal deformation by GPS/acoustic coupling method", Journal of the Society of Instrument and Control Engineers, The Society of Instrument and Control Engineers, Jun. 2014, vol. 53, No. 6, pp. 473 to 476.
Ichiro Isozaki et al., "Deep Sea Pressure Observation and Its Application to Pelagic Tide Analysis", Papers in Meteorology and Geophysics, vol. 31, No. 2, pp. 87 to 96, Sep. 1980.

* cited by examiner

| FIRST MEASUREMENT DAY | LENGTH OF FIBER [m] | LENGTH OF FIBER BETWEEN SITES [m] | |
|---|---|---|---|
| LENGTH OF FIBER TO SITE 1 L1 | 40,633.081 | $L_{01}$ | 40,633.081 |
| LENGTH OF FIBER TO SITE 2 L2 | 75,794.066 | $L_{12}$ | 35,160.985 |
| LENGTH OF FIBER TO SITE 3 L3 | 92,603.940 | $L_{13}$ | 16,809.874 |
| LENGTH OF FIBER TO SITE 4 L4 | 106,279.662 | $L_{14}$ | 13,675.722 |

| SECOND MEASUREMENT DAY | LENGTH OF FIBER [m] | LENGTH OF FIBER BETWEEN SITES [m] | | CHANGE [cm] |
|---|---|---|---|---|
| LENGTH OF FIBER TO SITE 1 L1 | 40,633.058 | $L_{01}$ | 40,633.058 | -2.3 |
| LENGTH OF FIBER TO SITE 2 L2 | 75,794.011 | $L_{12}$ | 35,160.953 | -3.2 |
| LENGTH OF FIBER TO SITE 3 L3 | 92,603.875 | $L_{13}$ | 16,809.864 | -1.0 |
| LENGTH OF FIBER TO SITE 4 L4 | 106,279.594 | $L_{14}$ | 13,675.719 | -0.3 |

Fig. 8

WATER PRESSURE FLUCTUATION MEASURING SYSTEM AND WATER PRESSURE FLUCTUATION MEASURING METHOD

This application is a National Stage Entry of PCT/JP2021/001729 filed on Jan. 19, 2021, which claims priority from Japanese Patent Application 2020-018851 filed on Feb. 6, 2020, the contents of all of which are incorporated herein by reference, in their entirety.

TECHNICAL FIELD

The present invention relates to a water pressure fluctuation measuring system and a water pressure fluctuation measuring method.

BACKGROUND ART

Various methods for measuring a movement of the ground have been known. For example, a technique called "wire sensor", in which a wire through which an electric signal is conducted is laid on the ground, and a situation in which the wire has been cut is detected as abnormality, and thus landslides or the like are monitored, has been known. Another technique called "optical fiber sensor", in which the above conductive wire is replaced by an optical fiber cable and monitoring similar to the above is performed, has been known as well.

In optical fiber sensors, various methods including a method of detecting that an optical fiber has been broken and light propagation has been inhibited, and a method of laying on an optical fiber cable in such a way that bending loss increases according to tension applied to the optical fiber cable, thereby monitoring changes in the loss, have been used (Patent Literature 1 to 3). In Patent Literature 3, for example, a mechanism for automatically unwinding/winding a cable according to expansion and contraction of the ground is provided at an end point of an optical fiber cable, and a small loss is granted to the optical fiber at each monitoring point. The loss granting point is fixed to the ground and moves when the optical fiber cable moves with respect to the ground. This loss granting point is detected by Optical Time Domain Reflectometry (OTDR) that will be described later.

Another technique regarding optical passive elements called Fiber Bragg Grating (FBG), in which a diffraction grating that selectively reflects particular wavelengths is provided in an optical fiber by irradiating the optical fiber with ultraviolet rays, has also been known. This FBG may be provided at various points of an optical fiber cable, like the aforementioned loss granting point. When, for example, the FBG is accommodated in such a package that a period of diffraction grating is changed due to an external influence (e.g., strain or temperature), the reflection wavelength of the FBG is changed according to an environment where the FBG is installed. By irradiating the FBG with probe light and measuring the reflection light, information on the strain and the temperature at a place where the FBG is installed can be acquired. In a configuration in which a plurality of FBGs are provided in one optical fiber cable, these FBGs may be arranged and designed in such a way that initial reflection wavelengths of the FBGs do not overlap one another, and thus FBGs can be distinguished from one another depending on the wavelength of the reflection light.

One known method for checking health of an optical fiber transmission path is a technique called OTDR, in which pulse light is made incident on an optical fiber and power of the light that returns after reflection is measured along with time taken for the reflection light to return. Since weak reflection light due to Rayleigh scattering is generated in the optical fiber, a state in which the reflection light weakens due to an influence of transmission loss as the pulse light propagates through the optical fiber is observed as a trace. At this time, when there is a reflecting point or bending loss in the optical fiber, the power of the reflection light increases or decreases at a specific position of the trace, whereby the place can be identified. In this way, in the OTDR, the place where power fluctuations occur can be discerned by measuring the time taken for the reflection light to return (Patent Literature 4).

A method of applying OTDR to a configuration in which a plurality of sensor elements are connected to an end of one optical fiber has also been generally used. When, for example, an optical fiber sensor is provided with a plurality of sensor elements in which a situation of a place where each sensor element is installed is reflected in the bending loss, a loss that occurs at each of the installation locations can be monitored for each location by checking the trace of the OTDR. Further, a technique that uses FBG as a reflecting element in OTDR has also been used. The OTDR used for such multi-point sensing may be referred to as Interrogator.

Besides the aforementioned methods, techniques for providing elements that cause partial reflection in the middle of an optical fiber transmission path and monitoring health of an optical amplification repeater (Patent Literatures 6 and 7) have been known. Patent Literature 7 discloses a technique for identifying a place depending on a combination with OTDR. Further, detection of crustal deformation in which a GPS and echo ranging are combined with each other (Patent Literature 8 and Non Patent Literature 1) and a technique for installing, on the bottom of water, an optical transmission/reception apparatus that propagates light for surveying under water (Patent Literature 9) are also known.

Further, in order to detect a tide level in offshore and a state of a tsunami, several methods for measuring a water pressure change in an offshore seabed have been known. A typical method is that a water pressure sensor is installed on the seabed and measured data are transmitted to land via an undersea cable (Non Patent Literature 2). Furthermore, a technique for detecting, on land, a scene where an undersea cable itself changes under an influence of a water pressure is disclosed (Patent Literature 10).

CITATION LIST

Patent Literature

[Patent Literature 1] Japanese Unexamined Patent Application Publication No. H08-14952
[Patent Literature 2] Japanese Patent No. 4187866
[Patent Literature 3] Japanese Patent No. 3653550
[Patent Literature 4] Published Japanese Translation of PCT International Publication for Patent Application No. 2007-518365
[Patent Literature 5] Japanese Patent No. 3440721
[Patent Literature 6] Japanese Patent No. 3509748
[Patent Literature 7] Japanese Patent No. 3391341
[Patent Literature 8] U.S. Pat. No. 3,860,900
[Patent Literature 9] Japanese Patent No. 2906232
[Patent Literature 10] Japanese Patent No. 2586838

Non Patent Literature

[Non Patent Literature 1] Keiichi Tadokoro, "Observation of seafloor crustal deformation by GPS/acoustic coupling method", Journal of the Society of Instrument and Control Engineers, The Society of Instrument and Control Engineers, June 2014, Volume 53, No. 6, pp. 473 to 476

[Non Patent Literature 2] Ichiro Isozaki et al., "Deep Sea Pressure Observation and Its Application to Pelagic Tide Analysis", Papers in Meteorology and Geophysics, September 1980, Volume 31, No. 2, pp. 87 to 96

SUMMARY OF INVENTION

Technical Problem

However, the aforementioned techniques assume detection of sudden changes in the ground, such as landslides or slope failures. With the aforementioned techniques, it is difficult to detect a slight and slow movement of the ground, such as crustal deformation, by reflecting the movement in changes in length of the optical fiber.

While strain sensors such as FBG strain sensors are used for monitoring local strains like strains on an architecture such as a bridge or a structure such as an aircraft, the strain sensors are not suitable for an application in which a long base line length is observed, and expansion and contraction of the ground having a wide range, such as crustal deformation, are integrated and detected.

The aforementioned OTDR, which is generally used for measuring the entire length of an optical fiber cable, cannot monitor a state of expansion and contraction of a cable in the middle of the cable.

In addition, the aforementioned method for detecting a tide level in offshore and a state of a tsunami detects an influence of a water pressure change being received by an undersea cable by assembling a long optical interferometer, and, in order to know a water pressure change for each section of the undersea cable, a large number of long optical interferometers need to be formed, a large number of core wires are required, and therefore there is a difficulty in economic efficiency.

The present invention has been made in view of the aforementioned circumstances and an object of the present invention is to detect a water pressure fluctuation.

Solution to Problem

A water pressure fluctuation measuring system according to one aspect of the present invention includes: a cable that includes a first optical fiber and is provided on or in the ground of a seabed, in such a way that the first optical fiber is expanded and contracted according to a fluctuation of a water pressure; an optical output unit configured to output monitoring light to the first optical fiber; a partial reflection unit provided on a path of the first optical fiber in the cable and configured to partially reflect the monitoring light; an optical reception unit configured to receive reflection light reflected by the partial reflection unit; and a calculation unit configured to measure a length of the first optical fiber to the partial reflection unit, based on a round-trip propagation time of the received reflection light, and monitor a change in the length over time.

A water pressure fluctuation measuring method according to one aspect of the present invention includes; providing a cable including a first optical fiber in which a partial reflection unit configured to partially reflect monitoring light is provided on a path, on or in the ground of a seabed in such a way that the first optical fiber is expanded and contracted according to a fluctuation of a water pressure; outputting the monitoring light to the first optical fiber; receiving reflection light reflected by the partial reflection unit; and measuring a length of the first optical fiber to the partial reflection unit, based on a round-trip propagation time of the received reflection light, and monitoring a change in the length over time.

Advantageous Effects of Invention

According to the present invention, it is possible to detect a water pressure fluctuation.

BRIEF DESCRIPTION OF DRAWINGS

FIG. 8 is a diagram illustrating an example of the length of a fiber from a site 0 to a site 4 observed on each of the first and second measurement days by the surveying system according to the second example embodiment;

EXAMPLE EMBODIMENT

Hereinafter, with reference to the drawings, example embodiments of the present invention will be described. Throughout the drawings, the same components are denoted by the same reference symbols and redundant descriptions will be omitted as appropriate.

First Example Embodiment

Figure 1:
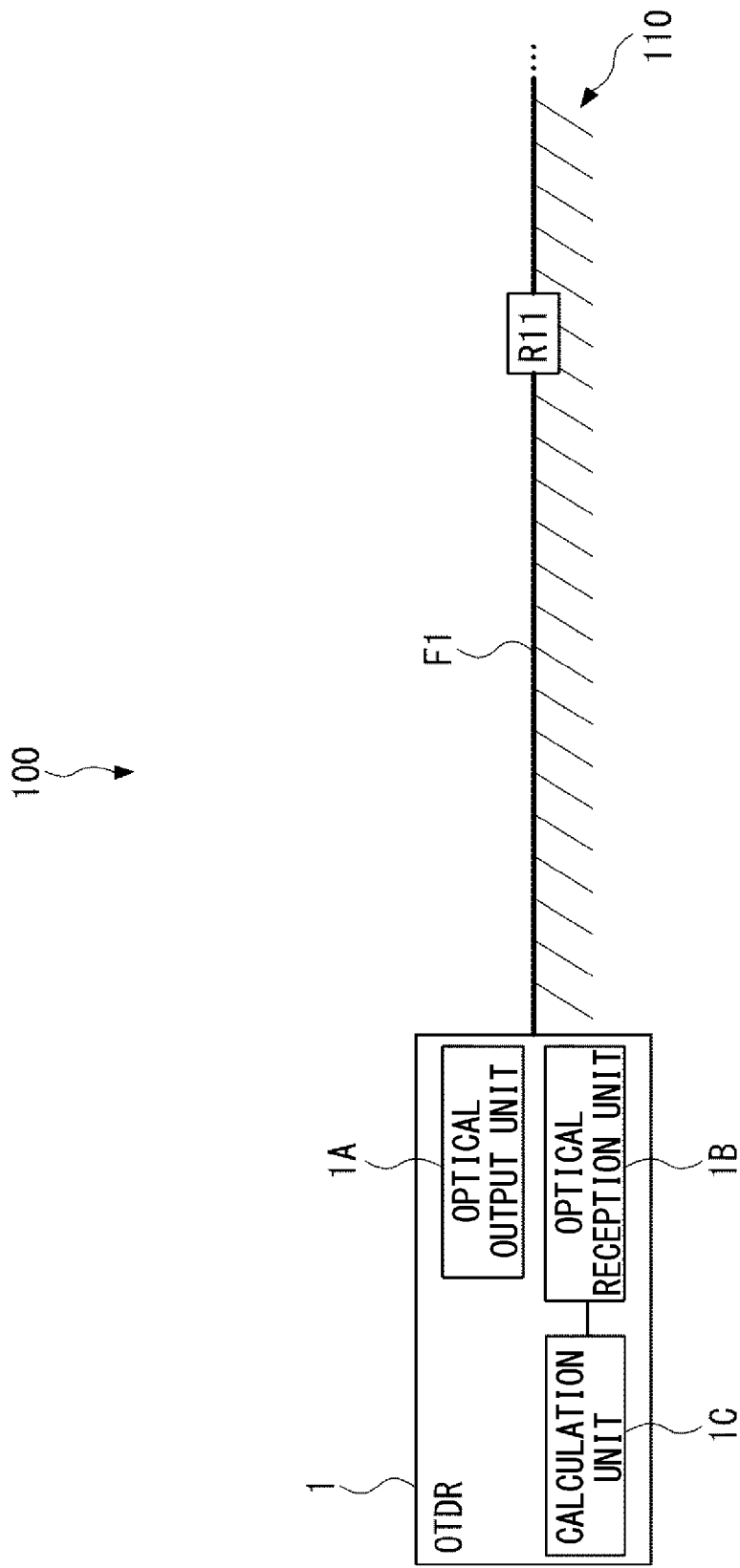
FIG. 1 is a diagram schematically illustrating a configuration of a surveying system according to a first example embodiment.

A surveying system 100 according to a first example embodiment will be described. The surveying system 100 is configured to detect a movement of the ground by applying Optical Time Domain Reflectometry (OTDR) to an optical fiber laid on the ground. FIG. 1 schematically illustrates a configuration of the surveying system 100 according to the first example embodiment. The surveying system 100 includes an OTDR device 1, an optical fiber cable F1, and a partial reflection unit R11.

The optical fiber cable F1 is laid on, for example, in such a way that it traverses the seabed in an area in which it is desired to monitor the movement of the ground 110 and that a moderate tension is applied to the optical fiber cable F1. The optical fiber cable F1 includes the partial reflection unit R11 provided at the point in the observation area where the movement of the ground 110 is monitored. One end of the optical fiber cable F1 is connected to the OTDR device 1 installed in a land station or the like. In this example, the partial reflection unit R11 is configured as a partial reflection unit that reflects a part of an incident light.

Figure 2:
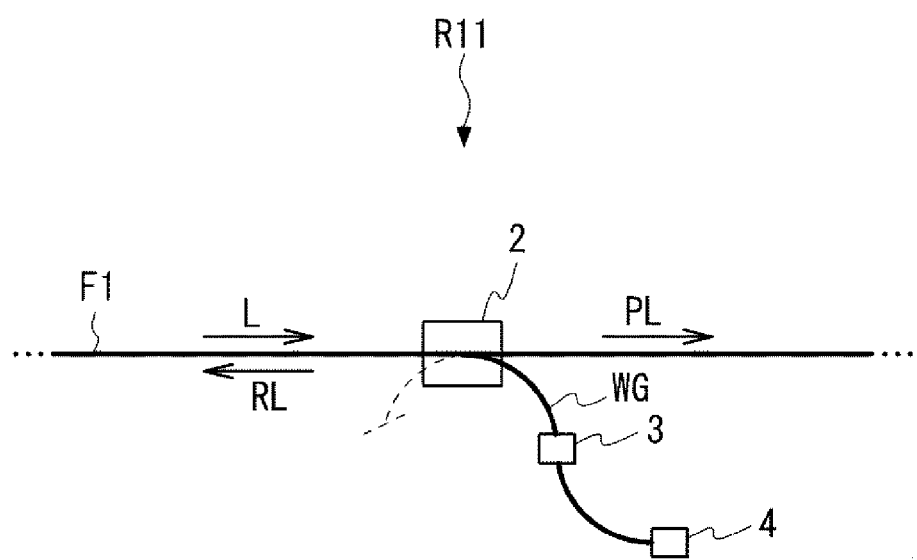
FIG. 2 is a diagram schematically illustrating a configuration example of a partial reflection unit.

With reference to FIG. 2, one example of a configuration of the partial reflection unit R11 will be described. This configuration has been widely used as a method of providing the partial reflection unit. In the partial reflection unit R11, light L is made incident from the left of FIG. 2, a part of the light L is reflected to be reflection light RL, which returns to the left. Further, a passing light PL, which is most of the light L that has not been reflected in the partial reflection unit R11, passes through the partial reflection unit R11 and exits to the right.

The incident light L is demultiplexed, by an optical coupler 2, into the passing light PL and light which will later become reflection light. The light which will later become reflection light passes through an optical attenuation element 3, is totally reflected after reaching a total reflection element 4 provided at an end of the cable, is multiplexed by the optical coupler 2 while propagating through the original path, and is transmitted toward the light source as the reflection light RL. As the total reflection element 4, ferrule or the like having an end surface on which gold is vapor-deposited can be used.

The reflectance and the transmittance according to this configuration are first roughly determined by the branch ratio of the optical coupler 2. When, for example, the branch ratio of the optical coupler is 80:20, the transmittance is 80%, that is, it is attenuated by about 1 dB and the reflection light RL is at least 4%, that is, it is attenuated by about 14 dB since the reflection light RL passes through the optical coupler twice. As will be described later, since it is assumed that a plurality of partial reflection units are provided on the optical fiber cable, the transmission and the reflection can be balanced by appropriately selecting the branch ratio of the optical coupler. Next, by adjusting the amount of attenuation of the optical attenuation element 3, the reflectance can be adjusted to be lowered. The optical attenuation element 3 can be separately adjusted easily as it can be provided by fusion-splicing optical fibers while the central axes of these two optical fibers are slightly shifted from each other. With these adjustment parameters, the reflectances of the respective partial reflection units may be made different from one another. In this configuration, the partial reflection unit serves in only one direction, which means there is no need to take an influence of multiple reflection into account. Other than the aforementioned one, various forms such as an FBG having a relatively low reflectance and a module configuration using a two-core ferrule are known and can be used as the partial reflection unit.

The OTDR device 1 is configured as a device capable of executing OTDR, in which a pulse light, which is monitoring light, is output to the optical fiber F1 (a first optical fiber), return light due to Rayleigh scattering, etc., is monitored, and a trace of the power of the reflection light is acquired. The OTDR device 1 includes an optical output unit 1A, an optical reception unit 1B, and a calculation unit 1C. The optical output unit 1A outputs the pulse light to the optical fiber F1. The optical reception unit 1B converts the return light from the optical fiber F1 into an electric signal. The calculation unit 1C monitors the electric signal output from the optical reception unit 1B, calculates the trace drawn by the power of the return light, detects the position of the partial reflection unit on the fiber, and records the detected position. In the following description, the trace drawn by the power of the return light is referred to as an OTDR waveform.

In other words, it will be understood that the calculation unit 1C measures the length of the optical fiber F1 to the partial reflection unit R11 based on a round-trip propagation time of the return light (reflection light) and monitors its changes over time.

The monitoring of the changes in the length of the optical fiber F1 over time, which has been described as being performed by the calculation unit 1C, may instead be performed by a control unit or the like included in an external apparatus provided in the outside of the OTDR device 1. That is, the calculation unit 1C may measure the length of the optical fiber F1 to the partial reflection unit R11 based on the round-trip propagation time of the return light (reflection light) and the control unit or the like included in the external apparatus may monitor its changes over time according to the results of measuring the length of the optical fiber F1 that has been measured.

Figure 3:
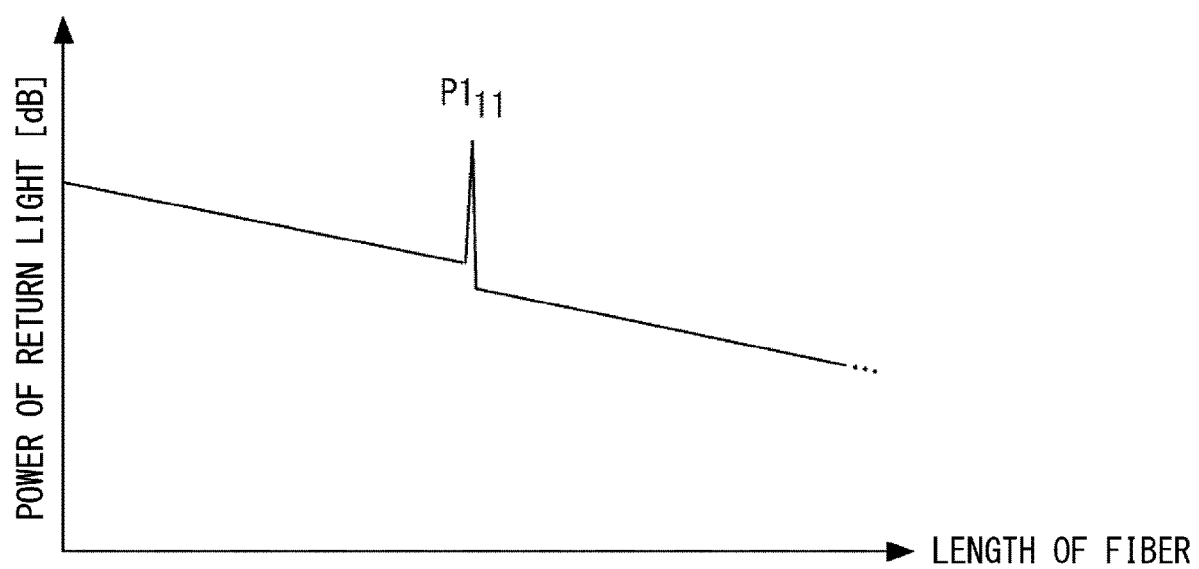
FIG. 3 is a diagram illustrating one example of an acquired OTDR waveform.

The detection of the movement of the ground 110 in the surveying system 100 will be described. The OTDR device 1 performs OTDR measurement on the optical fiber F1, automatically detects partial reflection points included therein, and records the positions of the respective partial reflection points on the optical fiber, i.e., the length of the fiber from the OTDR to each of the respective partial reflection points. FIG. 3 illustrates one example of the obtained OTDR waveform. The vertical axis indicates the power of the return light (e.g., logarithmic expression) and the horizontal axis indicates the length of the fiber. Since the light pulse is strongly reflected by the partial reflection unit R11 at the point that corresponds to the position where the partial reflection unit R11 is provided, the power of the return light becomes locally high, which causes a peak $P1_{11}$ to appear. The calculation unit 1C automatically detects this peak and outputs the detected peak.

By repeatedly performing the aforementioned OTDR measurement at time intervals, a relatively slow movement of the ground 110 is detected. In the following description, measurement days will be referred to as a first measurement day, a second measurement day, and so on.

Figure 4:
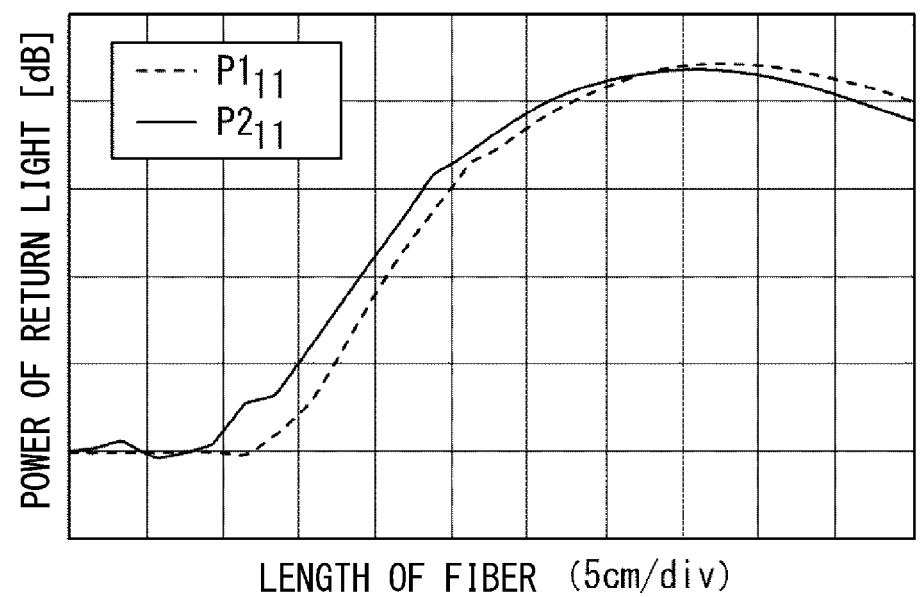
FIG. 4 is an enlarged diagram of the rising of a peak that corresponds to the partial reflection unit on each of first and second measurement days.

When there is a movement in the ground 110 and the optical fiber cable F1 is expanded and contracted as a result of the movement, the position of each partial reflection unit on each of the first measurement day and the second measurement day appears to move. FIG. 4 is an enlarged diagram of the rising of the peak that corresponds to the partial reflection unit R11 on each of the first and second measurement days. The waveform of the first measurement day is illustrated by a dashed line and the waveform of the second measurement day is illustrated by a solid line. As will be seen in FIG. 4, a peak $P2_{11}$ on the second measurement day is slightly shifted to the left of the peak $P1_{11}$ on the first measurement day. This indicates that the optical fiber cable F1 has been slightly shrunk and the length of this cable has been reduced, and the partial reflection unit R11 has been slightly closer to the land station (i.e., the OTDR device 1).

According to this configuration, by comparing the peak positions by reflection light from one partial reflection unit on two measurement days separated from each other, it is possible to detect the movement of the ground at the position where the partial reflection unit is provided.

By laying on the optical fiber cable F1 in such a way that it has sufficient friction between it and the seabed surface and a proper amount of tension remains, the optical fiber cable F1 is also expanded and contracted according to the expansion and contraction of the seabed surface, that is, the ground 110. In order to lay on the optical fiber cable F1 in such a way that a proper amount of tension remains, the optical fiber cable F1 may be laid on while the remaining tension is checked by, for example, a method of measuring the strain of the optical fiber F1 by Brillouin OTDR (BOTDR) on the ship.

Second Example Embodiment

Figure 5:
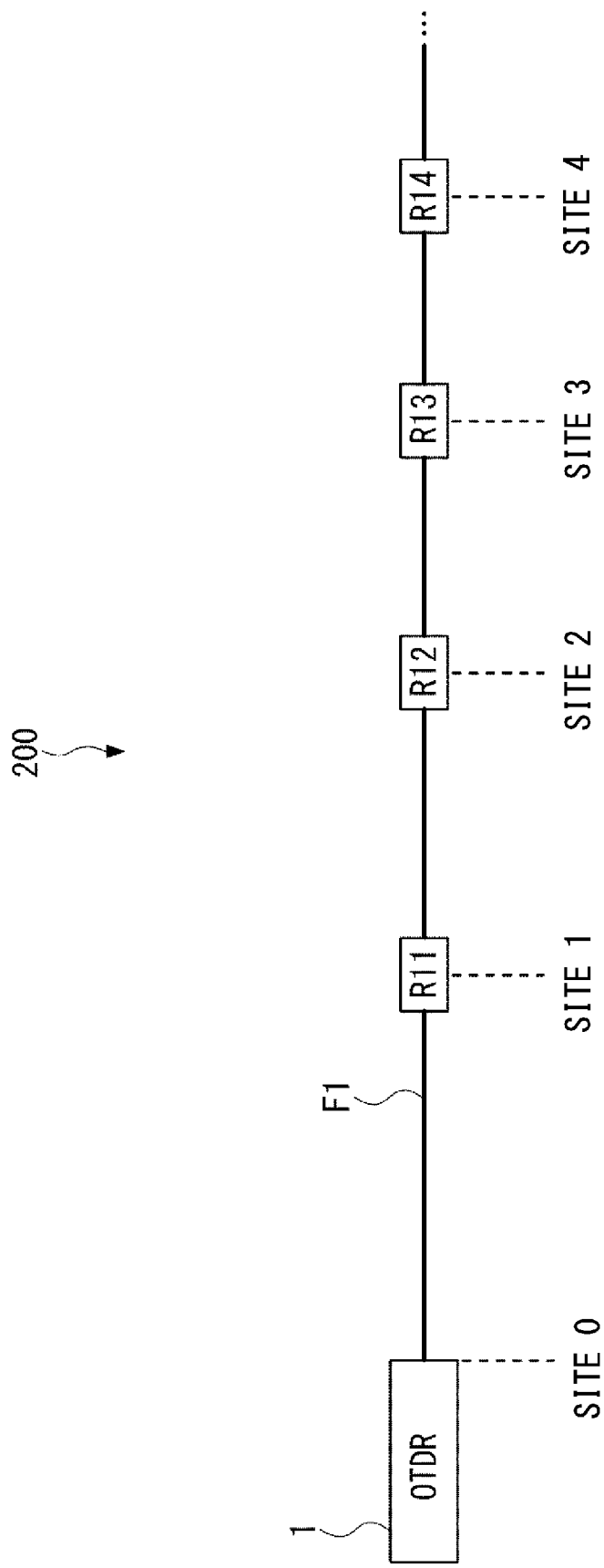
FIG. 5 is a diagram schematically illustrating a configuration of a surveying system according to a second example embodiment.

A surveying system 200 according to a second example embodiment will be described. FIG. 5 schematically illustrates a configuration of the surveying system 200 according to the second example embodiment. The surveying system 200 is different from the surveying system 100 in that a plurality of partial reflection units are provided in the surveying system 200. Specifically, the surveying system 200 has a configuration in which three partial reflection units R12-R14 are added to a part beyond the partial reflection unit R11. The place where the OTDR device 1 is installed is referred to as a site 0. While the optical fiber cable F1 is installed on the ground, like in FIG. 1, the ground is not illustrated in FIG. 5.

Figure 6:
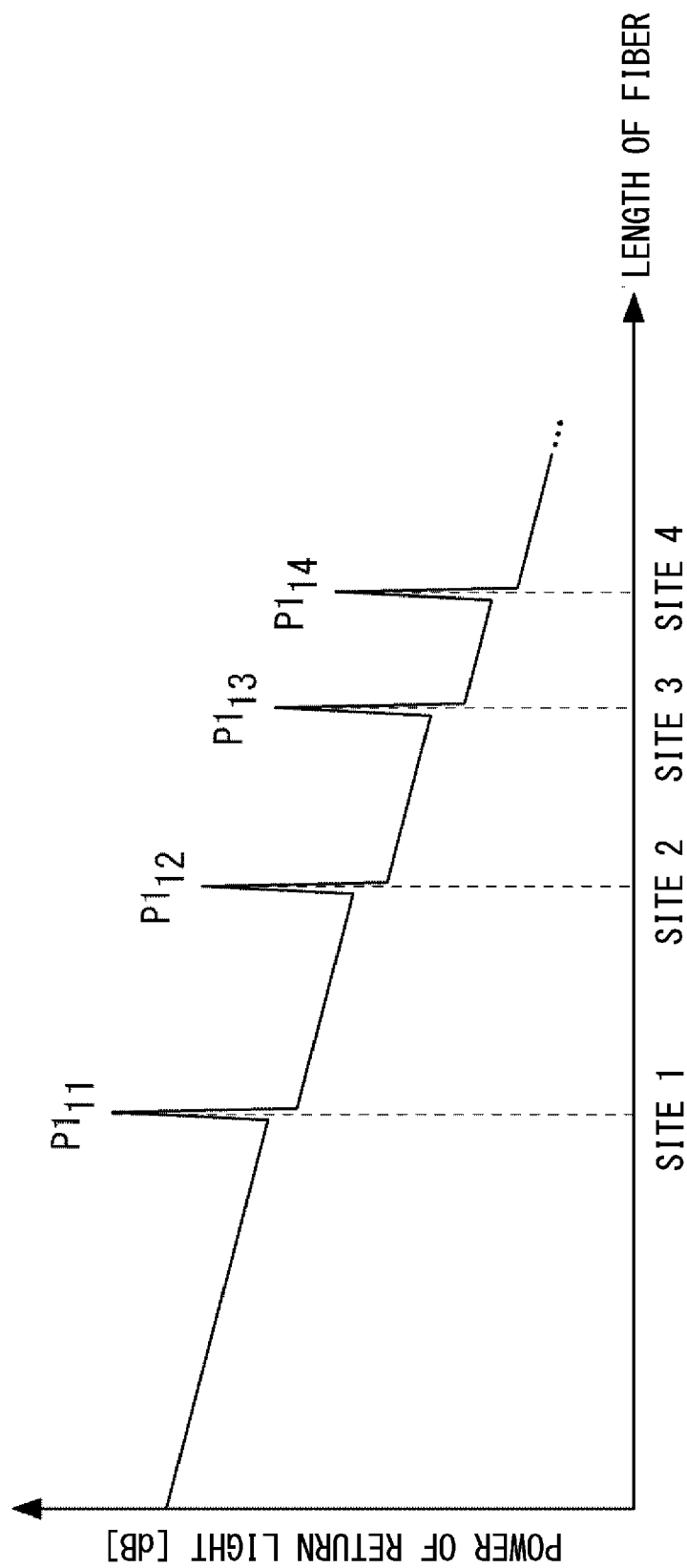
FIG. 6 is a diagram illustrating an OTDR waveform on a first measurement day according to the second example embodiment.

The detection of the movement of the ground in the surveying system 200 will be described. The surveying system 200 acquires OTDR waveforms on the first and second measurement days, like in the surveying system 100 according to an example embodiment. FIG. 6 illustrates an OTDR waveform on the first measurement day according to the second example embodiment. In FIG. 6, four partial reflection units R11-R14 are arranged in this order from the side closer to the one closest to the OTDR device 1. Therefore, four peaks $P1_{11}$, $P1_{12}$, $P1_{13}$, and $P1_{14}$ at the four sites 1-4 that correspond to the above four partial reflection units R11-R14 appear in this order.

Figure 7:
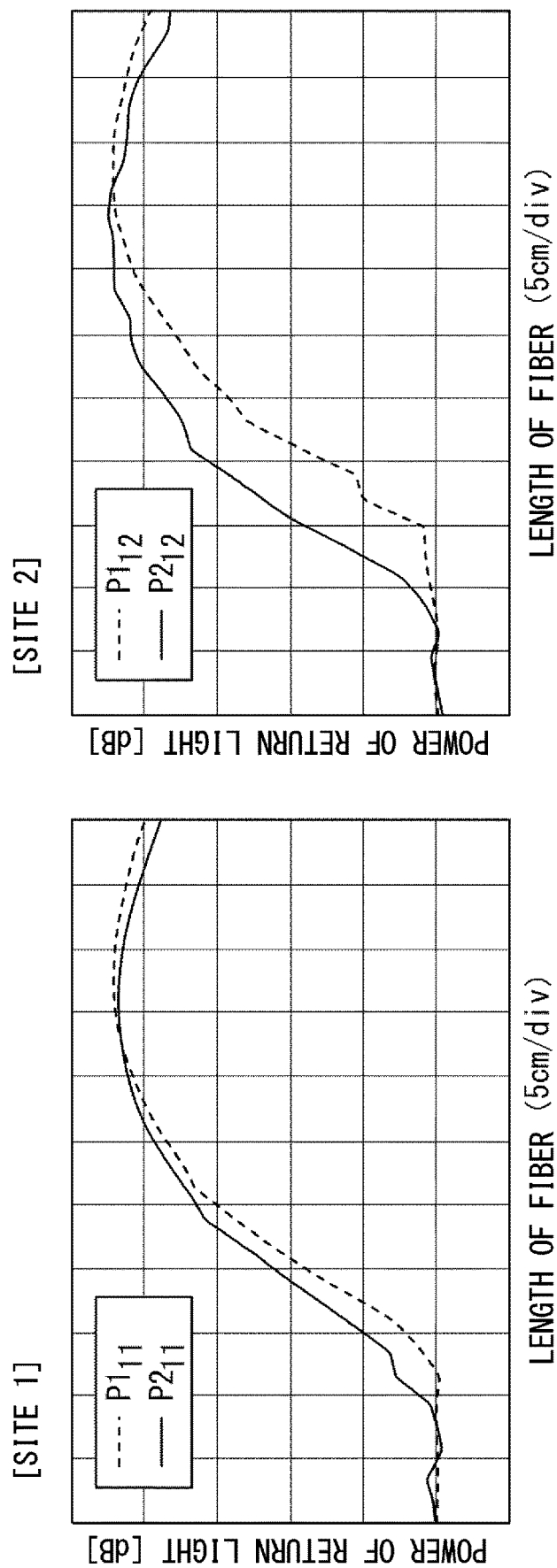
FIG. 7 is an enlarged diagram of the rising of a peak on each of first and second measurement days at a site 1 where a partial reflection unit is installed and a site 2 where a partial reflection unit is installed.

In this example embodiment, results of the measurement on the first measurement day are compared with those on the second measurement day, like in the first example embodiment. FIG. 7 illustrates an enlarged view of the rising of the peak on each of the first and second measurement days at the site 1 where the partial reflection unit R11 is installed and the site 2 where the partial reflection unit R12 is installed. The waveforms of the first measurement day are illustrated by dashed lines and the waveforms of the second measurement day are illustrated by solid lines.

When the change in the site 1 is compared to that in the site 2, the amount of shift of the peaks in the site 2 is larger than the amount of shift of the peaks in the site 1. Therefore, it can be understood that both the length of the cable in the part between the OTDR device 1 (the site 0) and the site 1 and the length of the cable in the part between the site 1 and the site 2 have been shrunk. This is because, if only the part between the OTDR device 1 and the site 1 has been shrunk and there is no expansion and contraction in any part beyond the above part, the amount of shift in a part beyond the site 1 becomes the same as that between the OTDR device 1 and the site 1.

FIG. 8 illustrates an example of measurement of the cable length from the site 0 to the site 4 observed on the first and second measurement days by the surveying system 200. In this example, the interval between the first measurement day and the second measurement day is about one year. In the measurement values of the cable length illustrated in FIG. 8, the influence of the temperature, tide and the like have already been removed. The length of the fiber between the site 1 and the site 2 is denoted by L12, the length of the fiber between the site 2 and the site 3 is denoted by L23, and so on.

As illustrated in FIG. 8, during the period between the first measurement day and the second measurement day, the part between the site 0 and the site 1 is shrunk by about 2.3 cm, the part between the site 1 and the site 2 is shrunk by about 3.2 cm, the part between the site 2 and the site 3 is shrunk by about 1.0 cm, and the part between the site 3 and the site 4 is shrunk by about 0.3 cm. In this way, by providing a plurality of partial reflection units, the state of the movement of the ground can be observed with a resolution indicated by units of the section held between two partial reflection units.

In general, as light propagates through the optical fiber F1, its power decreases due to transmission loss. Therefore, when the reflectances of the respective partial reflection units are the same, the farther a reflection point from the OTDR device 1 is, the lower the peak that appears in the OTDR waveform becomes. In general, the power of the return light in the OTDR is relatively weak, so the peak due to the reflection light tends to be buried in a noise level.

Figure 9:
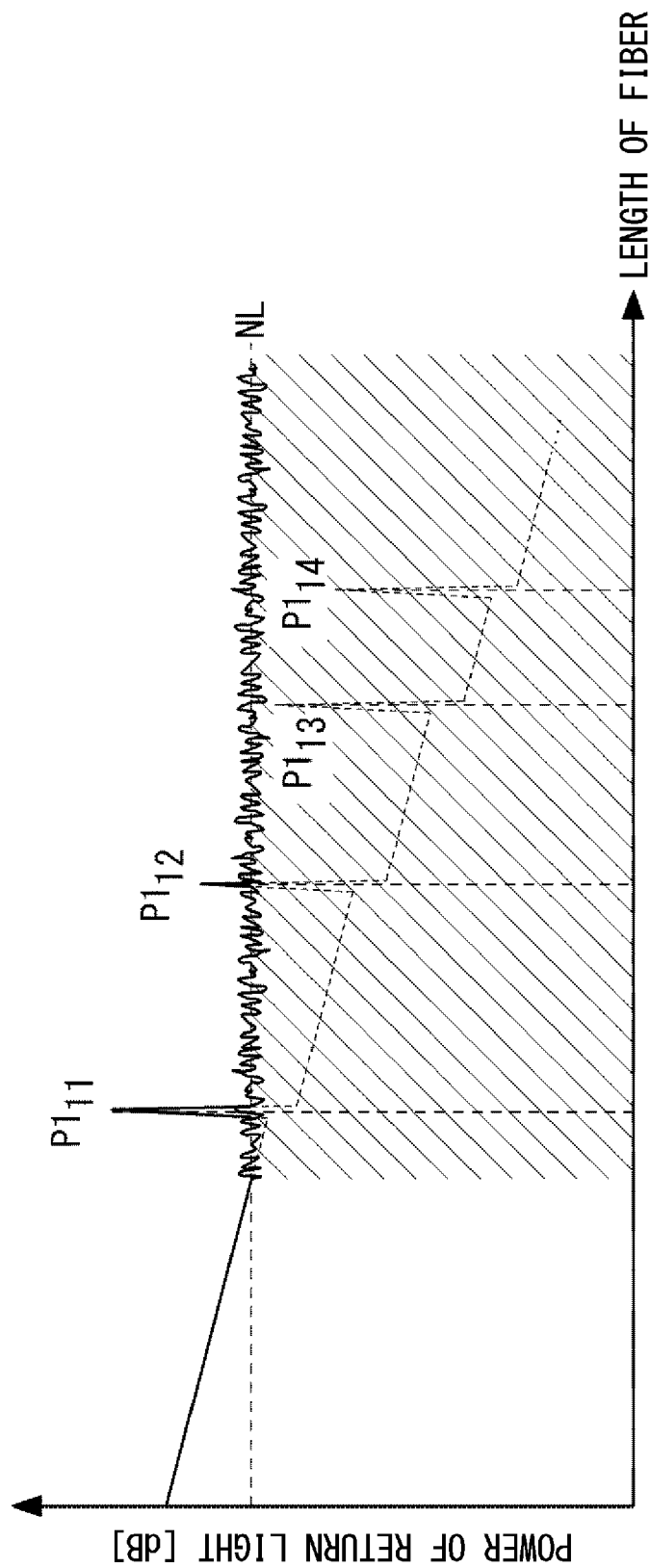
FIG. 9 is a diagram illustrating an example of the OTDR waveform when the reflectances of partial reflection units are the same.
Figure 10:
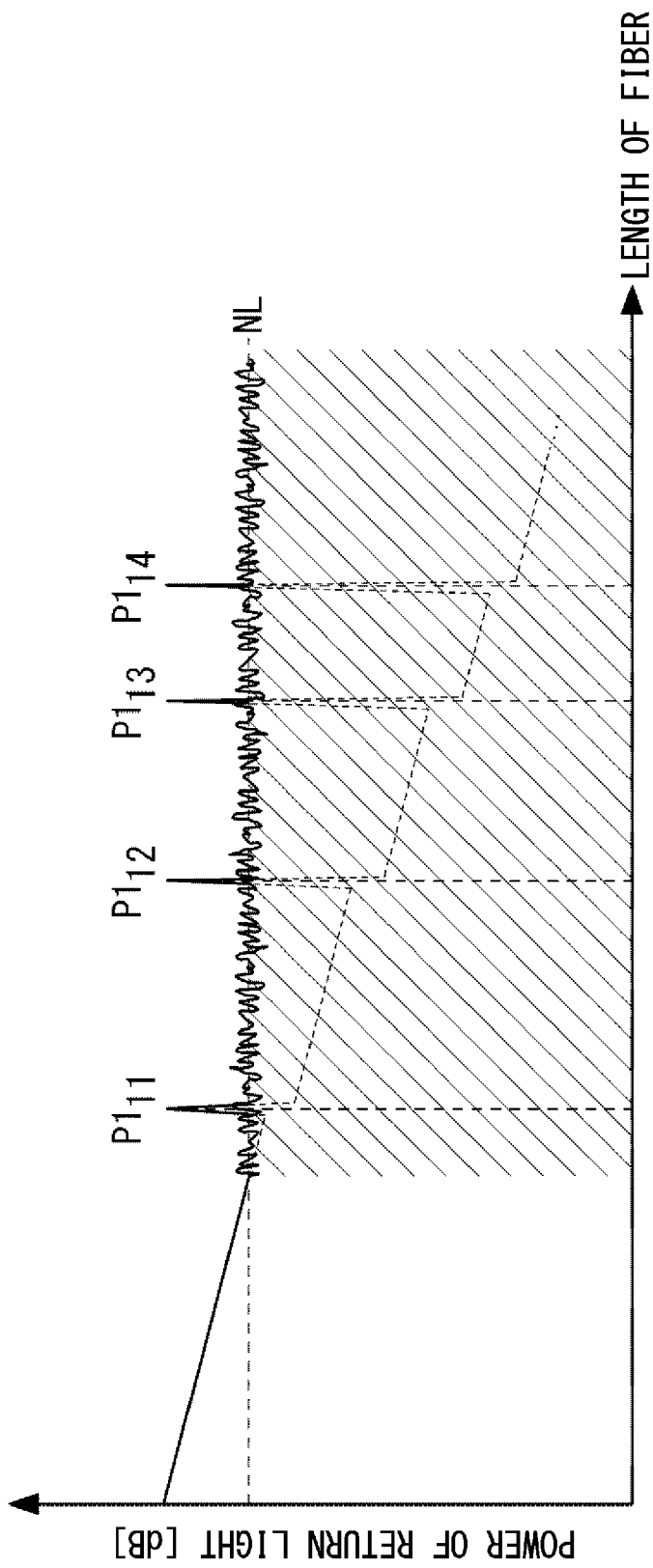
FIG. 10 is a diagram illustrating an example of an OTDR waveform when the reflectance of the partial reflection unit increases as the distance from the OTDR device increases.

In view of the above discussed matters, in this configuration, it is desirable that the reflectance be made low for a partial reflection unit installed in a place that is close to the OTDR device 1 and whose cumulative loss is small and the reflectance be made high for a partial reflection unit installed in a place that is far from the OTDR device 1 and whose cumulative loss is large. That is, when the reflectances of the partial reflection units R11-R14 are respectively denoted by Rf1-Rf4, they preferably have a relation Rf1<Rf2<Rf3<Rf4. FIG. 9 illustrates an example of the OTDR waveform when the reflectances of the partial reflection units R11-R14 are the same, and FIG. 10 illustrates an example of the OTDR waveform when the reflectance of the partial reflection unit is increased as the distance from the OTDR device 1 increases. While the peaks $P1_{13}$ and $P1_{14}$ of the partial reflection units R13 and R14, respectively, are buried in a noise level NL in FIG. 9, peaks in distant places are also not buried in the noise level NL and can be easily recognized in FIG. 10.

Accordingly, it becomes possible to reduce the average number of times of OTDR waveforms, that is, to shorten the measurement time. Since the measurement time is shortened, the influence of environmental factors such as temperature changes during this time can be naturally reduced.

Figure 11:
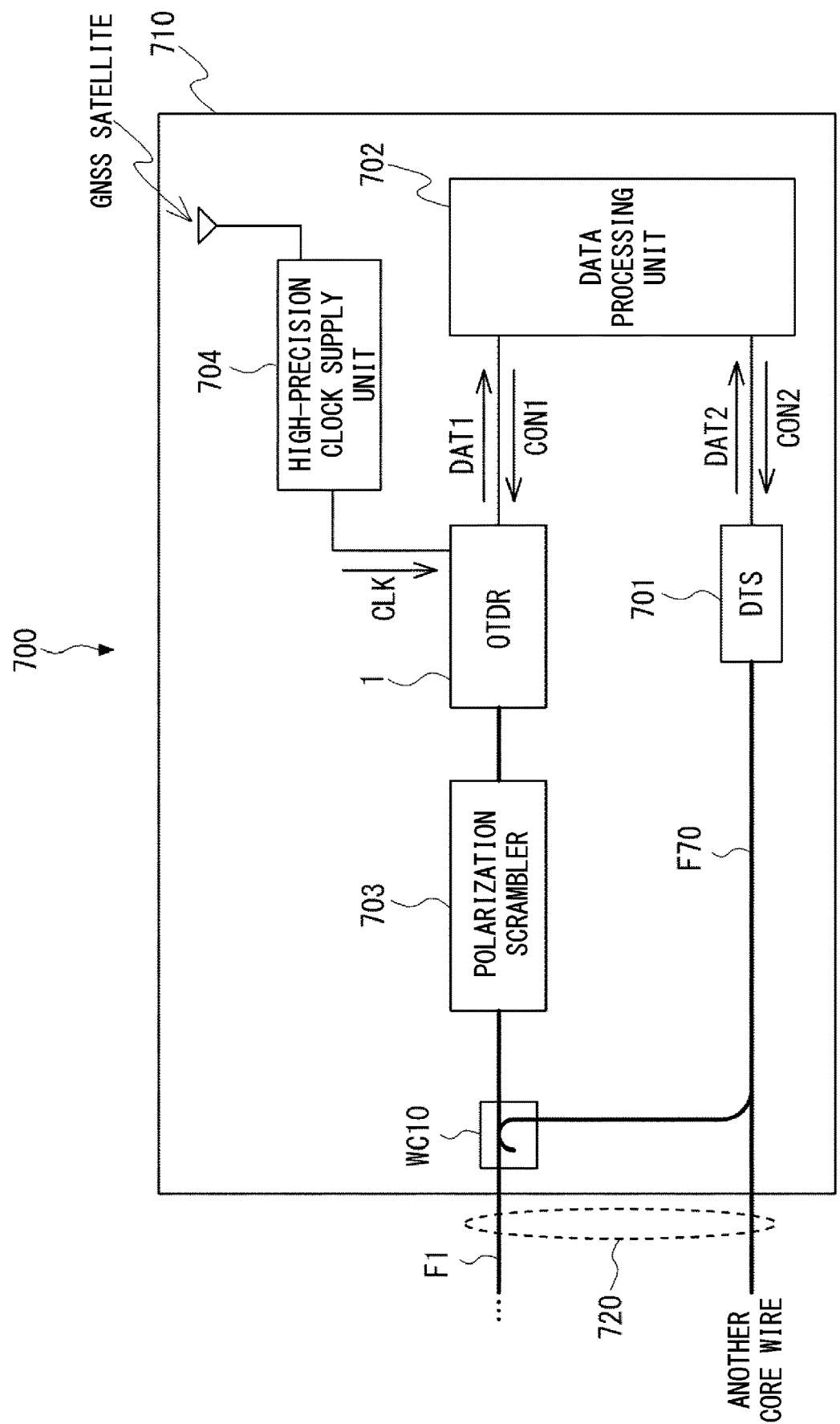
FIG. 11 is a diagram schematically illustrating a configuration of a surveying system 700 into which a technique for suppressing an error is introduced.

Now, a technique for suppressing an error in this surveying system will be described. FIG. 11 schematically illustrates a configuration of a surveying system 700 into which the technique for suppressing the error is introduced. The surveying system 700 has a configuration in which a Distributed Temperature Sensor (DTS) device 701, a data processing apparatus 702, a polarization scrambler 703, a high-precision clock supply unit 704, a wavelength demultiplexer WC0, and an optical fiber F70 are added to the surveying system 100 in a land station 710.

It is known that optical fiber cables are expanded and contracted depending on an external environment, especially, due to temperature changes. Therefore, when the movement of the ground is to be detected by using the surveying system in an environment where there is a temperature change, the influence of the expansion and contraction of an optical fiber cable due to temperature changes needs to be eliminated. In order to eliminate this influence, in this example embodiment, the temperature of the optical fiber cable in each place is measured by a Distributed Temperature Sensor (DTS).

As described above, the DTS device 701 measures the temperature of the optical fiber cable F1 in the longitudinal direction thereof in a distributed manner and outputs obtained data as DTS output data DAT2. As described in the above example embodiment, the OTDR device 1 outputs the position of each of the respective reflecting points on the cable as OTDR output data DAT1. The data processing apparatus 702 eliminates the influence of the expansion and contraction of the optical fiber cable due to changes in the temperature based on the OTDR output data DAT1 and the DTS output data DAT2. The data processing apparatus 702 is capable of controlling the OTDR device 1 by a control signal CON1 and is capable of controlling the DTS device 701 by a control signal CON2. This example illustrates a configuration in which the light measured in the DTS device 701 and the light measured in this surveying system are measured on one optical fiber using a wavelength multiplexing technique (WDM coupler WC10). Alternatively, the light may be multiplexed/demultiplexed using an optical coupler that has no wavelength selectivity and may be measured by controlling the timings when the OTDR device 1 and the DTS device 701 perform measurement in such a manner that they do not overlap each other. Alternatively, effects the same as those described above may be obtained by using another core wire (optical fiber) in the same cable 720 since it can be considered that the temperatures are almost the same.

Next, the polarization scrambler 703 will be described. In an optical fiber, there is a phenomenon called "polarization mode dispersion" in which, depending on the polarization state of light that propagates through the optical fiber, a slight difference occurs in the propagation speed of the light. In order to avoid this phenomenon, according to this configuration, the polarization scrambler 703 is provided in the output of the OTDR device 1 to constantly change the polarization state of the pulse light in a random manner. Accordingly, when the OTDR waveform is measured a plurality of times and averaged, the influence of the polarization mode dispersion is also averaged, whereby it is possible to suppress fluctuations of measurement values depending on the polarization state. Since some old optical fiber cables have a large polarization mode dispersion, this configuration is especially effective when old optical cables are reused.

Next, the high-precision clock supply unit 704 will be described. As the high-precision clock supply unit 704, in recent years, an apparatus that receives radio waves from a Global Navigation Satellite System (GNSS) satellite, generates a high-precision clock, and supplies the generated clock has been commercially available and been used. The clock CLK from the high-precision clock supply unit thus provided is supplied to the OTDR device 1. In particular, since the speed of the movement of the ground due to plate tectonics is as slow as about a few centimeters per year, the stability of clock in a low frequency range greatly affects the accuracy of the measurement. On the other hand, since such a long-term measurement stability is not required in general OTDR applications, if the high-precision clock itself is used, the accuracy of the measurement is likely to be insufficient. In order to provide this surveying system, it is important to improve a long-term accuracy of the measurement by supplying the high-precision clock to the OTDR device. As will be described later, in a configuration in which there are a plurality of OTDRs in this surveying system, it is sufficient that only one high-precision clock supply unit be provided and the clock may be distributed. When an ORDR device is installed in a place far away from the optical cable (e.g., seabed), a high-precision clock supply unit may be installed in one land station, and the clock may be distributed from this high-precision clock supply unit, so that observation based on a high-precision clock may be achieved even in the seabed where GNSS satellite radio waves do not reach. This will be described later as well.

As described above, according to this configuration, by applying some or all of the DTS, the polarization scrambler, and the high-precision clock supply to this surveying system, the accuracy of measuring the movement of the ground can be enhanced.

Third Example Embodiment

In the above operating principle of this surveying system, the optical fiber cable is in contact with the ground with sufficient friction between them. In reality as well, for example, since the undersea cable is in contact with the seabed surface for a long distance, an amount of accumulation of friction in the longitudinal direction of the cable becomes enormously large, which causes a case in which, when elongation of large amplitude occurs locally due to a submarine landslide or the like, a slide friction resistance of the cable exceeds a tension limit, which causes the cable to be cut.

In view of the above discussed matters, it can be expected that the ground and the cable will be expanded and contracted in an integrated manner due to the friction with the ground that the cable originally has even without any special fixing means. However, when, in particular, it is desired to carefully observe the situation of the expansion and contraction of the ground, it is possible that the cable may be locally slid, which causes detailed information regarding the expansion and contraction of the ground to be smoothed. In order to prevent this situation, an addition to the cable may be provided to increase the grip force applied to the seabed.

As one method, the surface of the cover of the cable may be provided with protrusions having a shape so as to allow the cable to easily get caught on rocks on the seabed. These protrusions may be formed integrally with a member that covers the cable when the cable is manufactured. Alternatively, any means for fixing the cable to the seabed more firmly may be provided in some parts of the cable. The latter one will be described in a third example embodiment.

Figure 12:
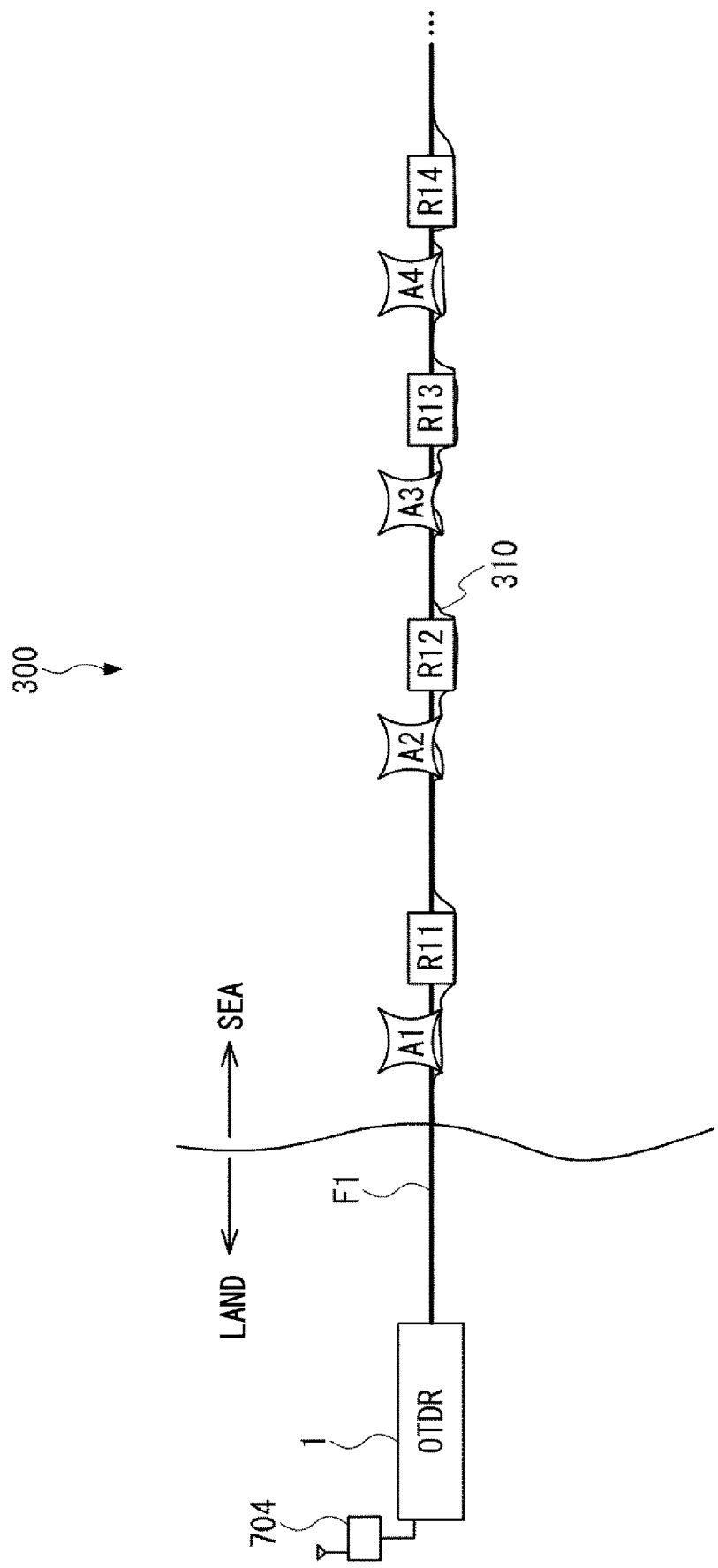
FIG. 12 is a diagram schematically illustrating a configuration of a surveying system according to a third example embodiment.

A surveying system 300 according to the third example embodiment will be described. FIG. 12 schematically illustrates a configuration of a surveying system 300 according to the third example embodiment. The surveying system 300 includes a configuration in which fixing members A1-A4 are added to the surveying system 200.

An optical fiber cable F1 is originally integrated with the seabed due to friction caused by a contact with the seabed surface. In addition, the optical fiber cable F1 is gripped more strongly on a seabed surface 310 by using the fixing members A1-A4 provided in some places of the optical fiber cable F1. On land, the fixing members A1-A4 may each be a member such as a pile that can be driven into the ground. In the seabed, the fixing members A1-A4 may each be a member (attachment) wound around the cable, the member having a shape so as to allow the cable to easily get caught on rocks on the seabed, and this cable may be laid on, or may each be a member such as an anchor wound around the cable, the member having an appropriate weight so as to generate a friction force when it is sunk into the sand of the seabed. In order to fix the above member and the cable, an element that is generally called a preformed stopper may be, for example, used so that the above member may be attached to the cable while the cable is laid on. When a cable having a length of hundreds of kilometers is wound and stored, the fixing members may get in the way of the storage or damage the cable. It is therefore desirable to attach the fixing members while the cable is laid on.

The positions or the type of the fixing members provided on the sensor cable may be changed as appropriate depending on the state of the seabed. The positional relation between the partial reflection units and the fixing members is not particularly limited. However, it is expected that, by equipping the fixing members close to the partial reflection units, the reliability of adhesion of the partial reflection units with the ground is increased, which helps improve the reliability of the observation data.

Fourth Example Embodiment

Figure 13:
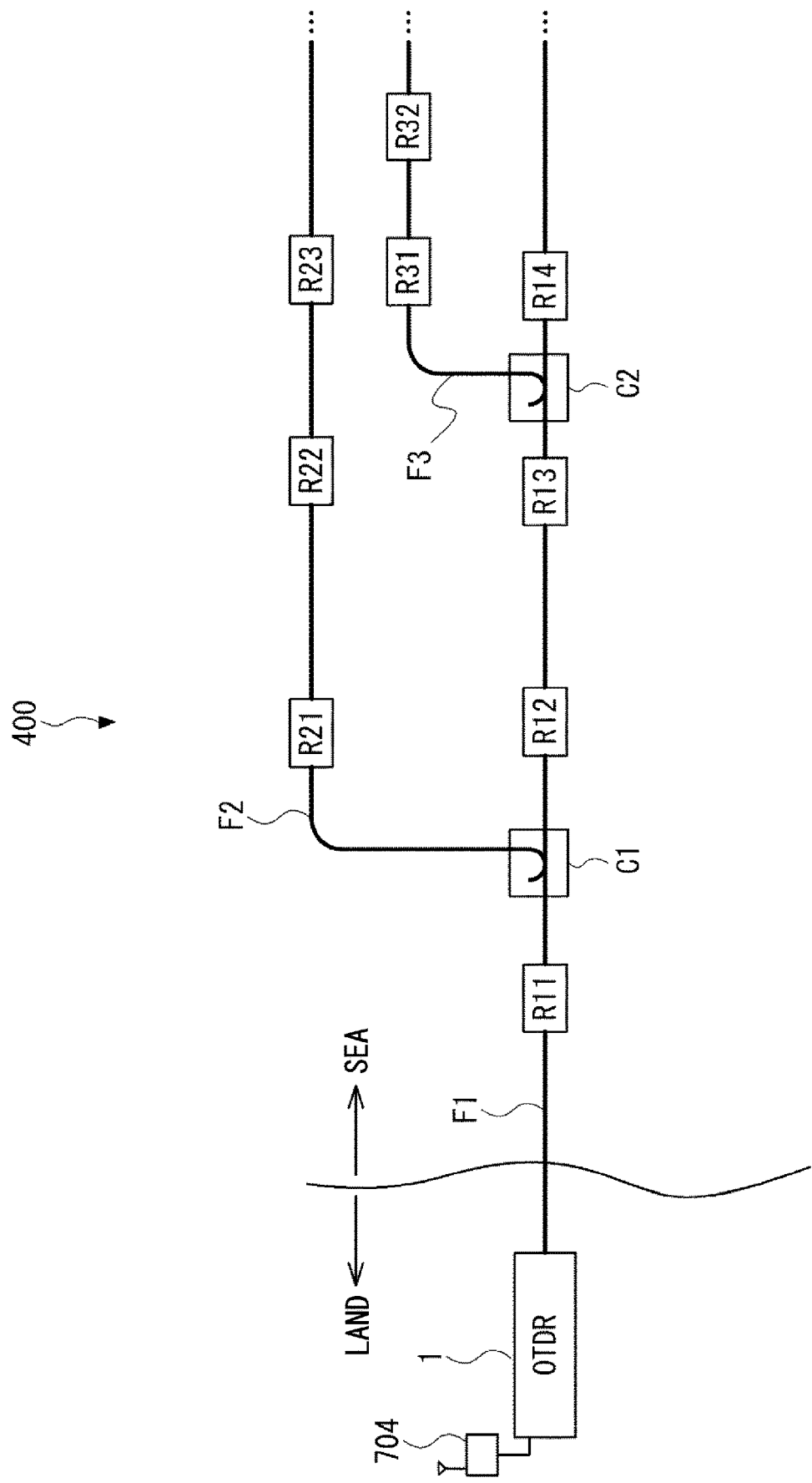
FIG. 13 is a diagram schematically illustrating a configuration of a surveying system according to a fourth example embodiment.

While the configuration in which there is only one optical fiber, that is, the configuration in which there is no branch in the middle of the fiber has been described in the first to third example embodiments, in the following example embodiments, a surveying system in which an optical fiber is branched into a plurality of fibers will be described. FIG. 13 schematically illustrates a configuration of a surveying system 400 according to a fourth example embodiment.

In the surveying system 400, optical fiber cables F2 and F3 (a second optical fiber) are branched from the optical fiber cable F1. In this example, partial reflection units R11-R14, . . . are provided in the optical fiber F1 in this order from the side closer to the OTDR device 1, just like in the surveying systems 200 and 300.

An optical coupler C1 is provided between the partial reflection unit R11 and the partial reflection unit R12, and the optical fiber F2 is branched from the optical coupler C1. The optical fiber F2 is provided with partial reflection units R21-R23, . . . in this order from the side closer to the optical coupler C1.

An optical coupler C2 is provided between the partial reflection unit R13 and the partial reflection unit R14, and the optical fiber F3 is branched from the optical coupler C2. The optical fiber F3 is provided with partial reflection units R31 and R32, . . . in this order from the side closer to the optical coupler C2.

Figure 14:
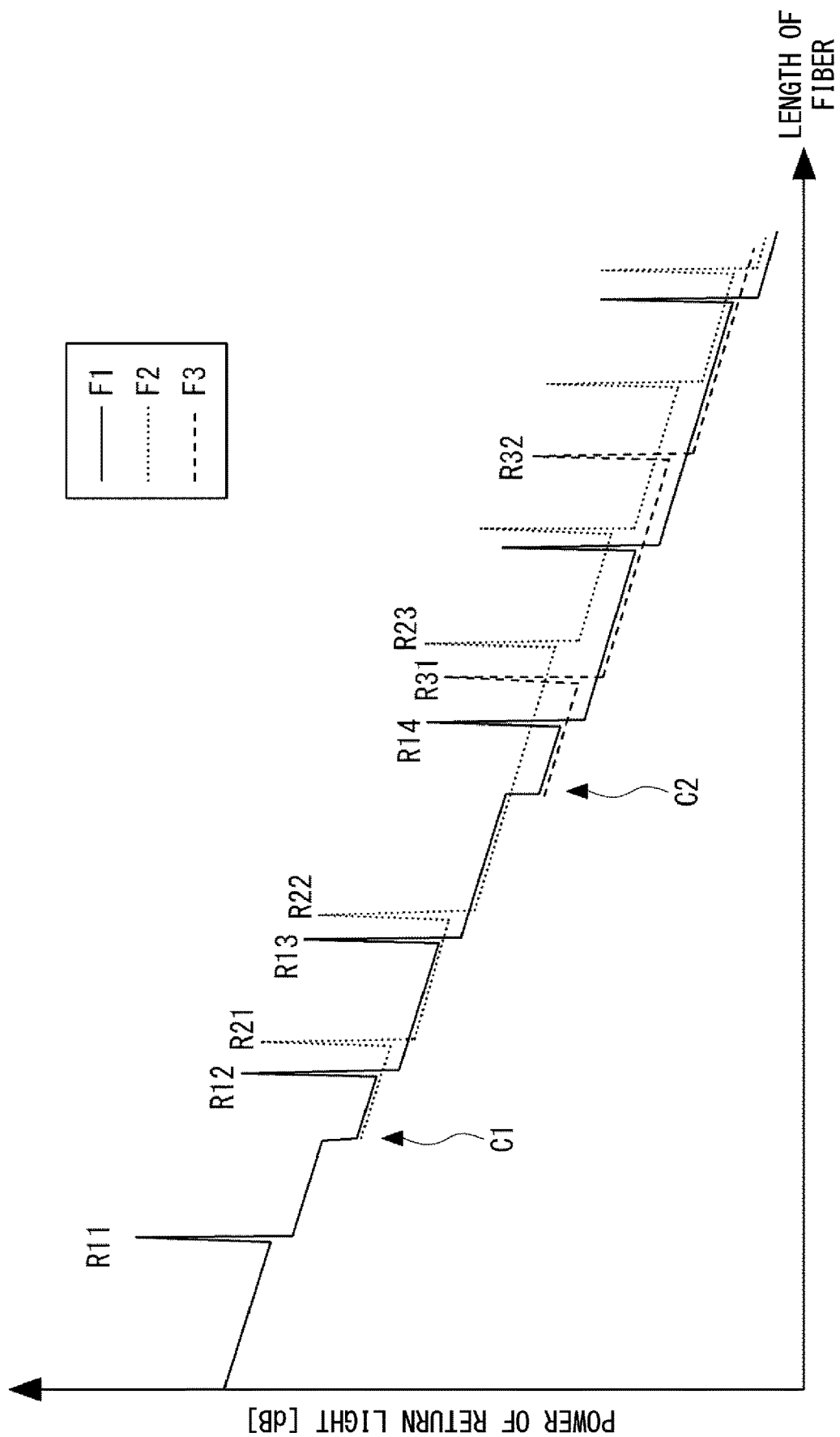
FIG. 14 is a diagram illustrating an OTDR waveform obtained in the surveying system according to the fourth example embodiment.

FIG. 14 illustrates an OTDR waveform obtained in the surveying system 400. While waveforms from the optical fibers F1, F2, and F3 are separately drawn in FIG. 14 for the sake of convenience of the description, one waveform obtained from the sum of these waveforms is actually observed. As will be understood from FIG. 14, unless the fiber lengths from the OTDR device 1 to each of the respective partial reflection units overlap each other, the peaks of the respective partial reflection units can be identified. If it is assumed that the length of the optical fiber from the branching point is 50 km, even when about 10 partial reflection units are provided in one optical fiber cable, it can be said that the probability that the reflection peaks overlap each other is extremely low since the size of each reflection part is several centimeters. Even if the reflection peaks overlap each other, this problem can be solved by providing a dummy optical fiber having a length of several meters in the branching point. It is possible to check the degree of overlap of reflection peaks in a temporary connection state before installation and provide a dummy fiber, or cut the root of the branch cable a little and then connect the branch cable to the branching part.

Therefore, according to this configuration, it is possible to detect the movement of the ground of the path on which an optical fiber cable is laid, like in the aforementioned example embodiments.

In the following description, this branch configuration is referred to as a passive branch (by a coupler). The effects of this branch configuration will be described. To put it shortly, compared to a sensor cable arrangement in a single stroke without branches, the range affected by a failure in the cable in a part beyond the branch can be limited in a sensor cable arrangement with branches. This is referred to as a first effect of the branch configuration.

The areas where it is desired to provide sensor cables are places where movements of the ground are noticeable. In such places, there is a relatively high risk of instantaneous and large-amplitude displacement, landslides, collapses or the like, and thus there is a high risk of cables being damaged. Therefore, the branch configuration is effective. This is because, with the branch configuration, the range of influence of a cable failure can be limited.

Figure 15:
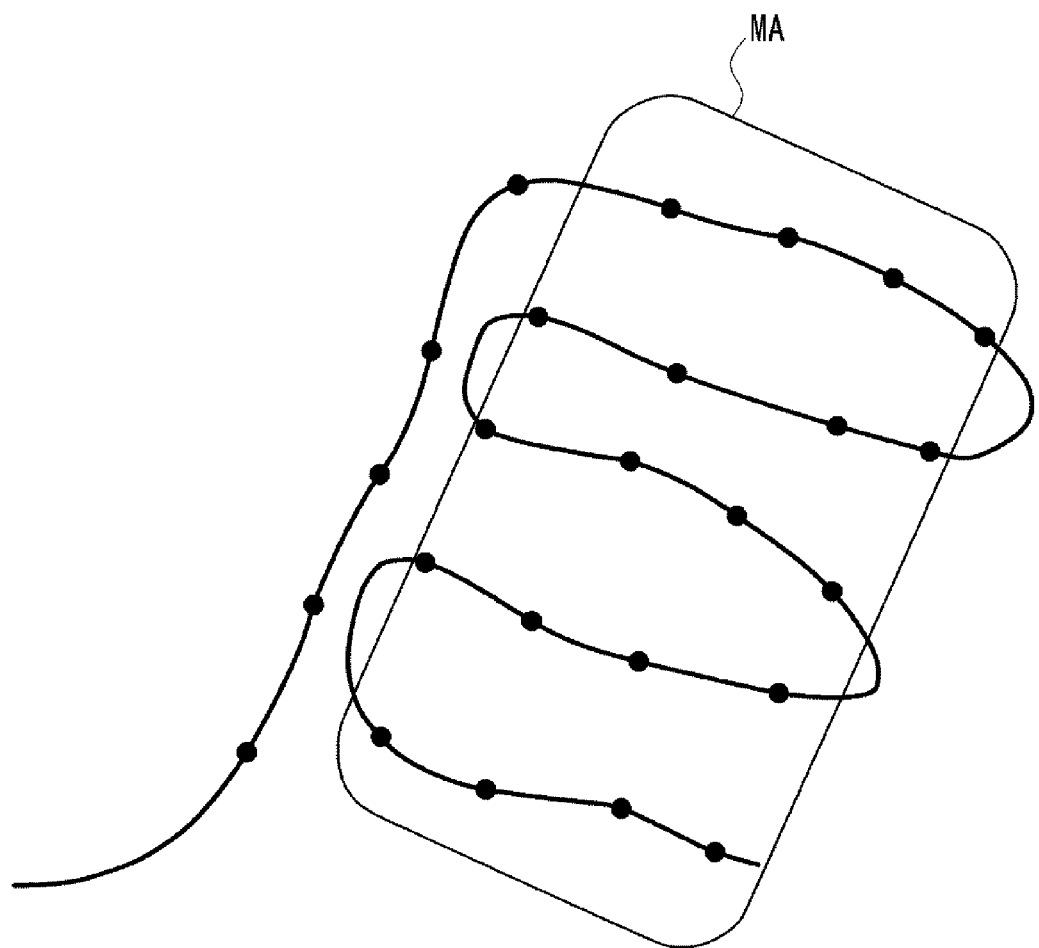
FIG. 15 is a diagram illustrating an example of a path on which a cable is laid in the surveying system in a case in which the optical fiber cable cannot branch.
Figure 16:
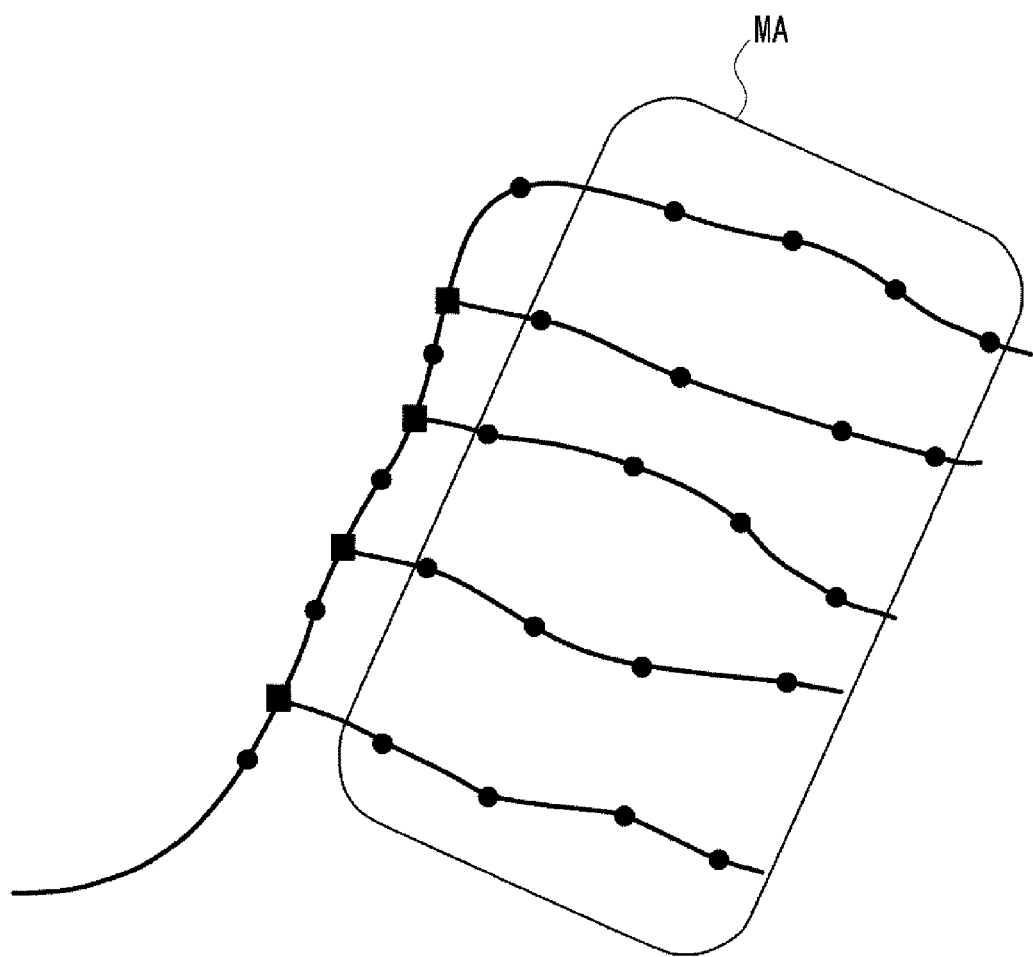
FIG. 16 is a diagram illustrating an example of a path on which a cable is laid in the surveying system in a case in which the optical fiber cable can branch.

With reference to FIGS. 15 and 16, the first effect of the branch configuration will be described. In this example, partial reflection units in a monitoring area MA are illustrated by circles and branching parts are illustrated by square marks in a simple manner. If the sensor cable is installed in a single stroke as illustrated in FIG. 15, no information on the place beyond the place where the cable failure has occurred can be obtained any longer. On the other hand, with the branch configuration as illustrated in FIG. 16, the influence of the cable failure can be kept within the branch cables.

Fifth Example Embodiment

In this example embodiment, a branch configuration using wavelength demultiplexing will be described. In the following description, this branch configuration is referred to as passive branch (by a WDM coupler).

Figure 17:
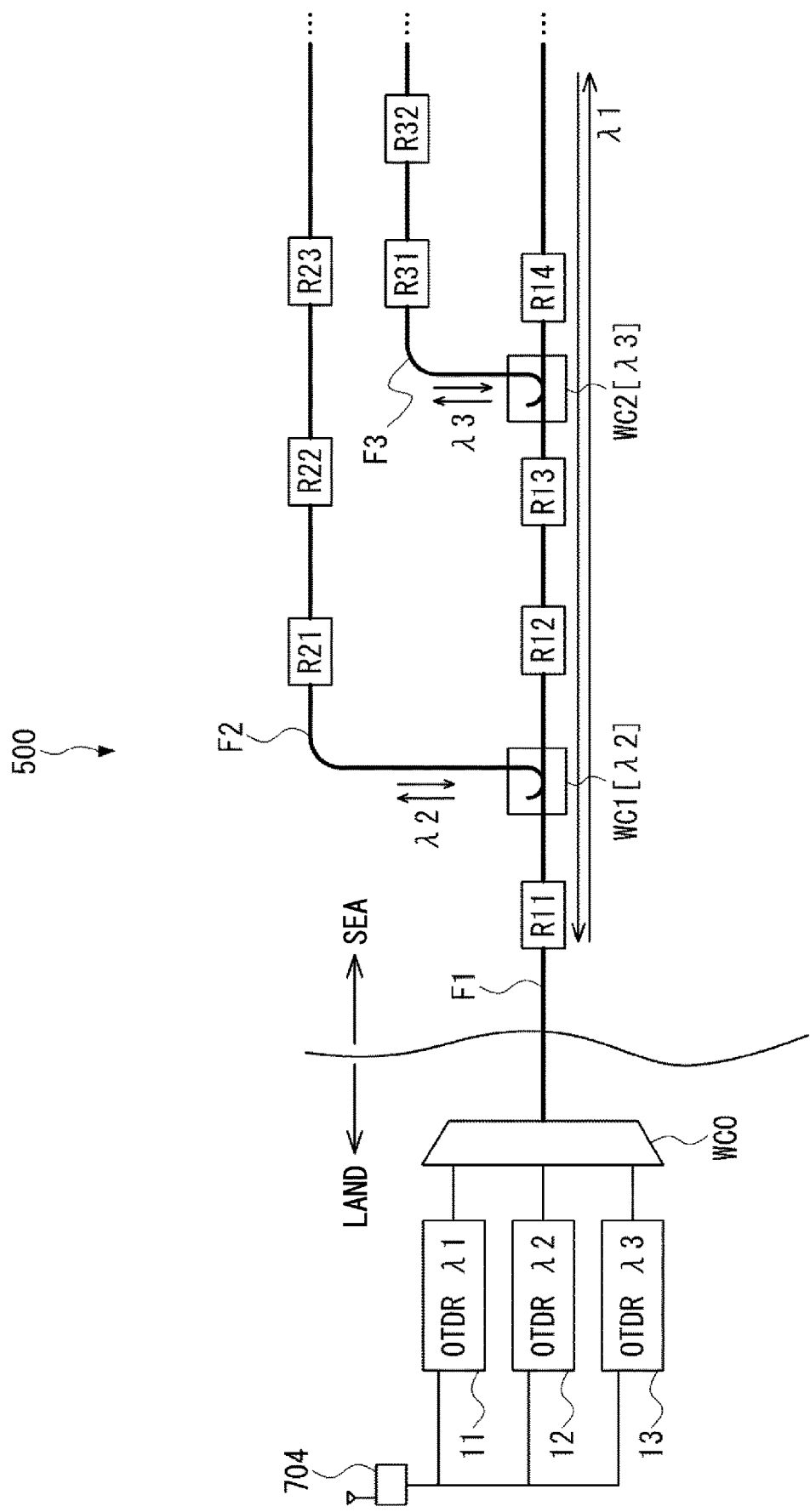
FIG. 17 is a diagram schematically illustrating a configuration of a surveying system according to a fifth example embodiment.

FIG. 17 schematically illustrates a configuration example of a surveying system 500 according to a fifth example embodiment. Since optical fibers and partial reflection units in the surveying system 500 are similar to those of the surveying system 400, the descriptions thereof will be omitted.

The surveying system 500 includes a plurality of, in this example, three, OTDR devices 11-13 whose transmission wavelengths are different from one another. The OTDR device 11 is also referred to as a first OTDR device and the OTDR devices 12 and 13 are also referred to as a second OTDR device. Further, in the surveying system 500, the optical couplers C1 and C2 are respectively replaced by WDM couplers WC1 and WC2.

The OTDR devices 11-13 are connected to an optical fiber F1 via a wavelength demultiplexer WC0 and output pulse lights having wavelengths $\lambda 1$ to $\lambda 3$ different from one another. In this example, the wavelength $\lambda 1$ is also referred to as a first wavelength and the wavelengths $\lambda 2$ and $\lambda 3$ are also referred to as a second wavelength.

The WDM coupler WC1 selectively branches the pulse light of the wavelength $\lambda 2$ and outputs the branched light to an optical fiber F2 and returns reflected return light from the optical fiber F2 to the optical fiber F1.

The WDM coupler WC2 selectively branches the pulse light of the wavelength $\lambda 3$ and outputs the branched light to an optical fiber F3, and the reflected return light from the optical fiber F3 is made to return to the optical fiber F1 by the WDM coupler WC2.

Therefore, the return lights of the wavelengths $\lambda 1$ to $\lambda 3$ return to the wavelength demultiplexer WC0 via the optical fiber F1. In this example, the wavelength demultiplexer WC0 is bidirectional, separates the return lights for each wavelength, and outputs the return lights of the wavelengths $\lambda 1$ to $\lambda 3$ to the OTDR devices 11-13, respectively. Accordingly, the OTDR devices 11-13 are able to independently monitor the return lights from the optical fibers F1 to F3.

In this example embodiment, the partial reflection units may partially reflect light independently of wavelength or may have wavelength selectivity. In the latter case, for example, R11, R12, R13, . . . may reflect only the light with a wavelength near $\lambda 1$ (first wavelength), R21, R22, R23, . . . may reflect only the light with a wavelength near $\lambda 2$ (second wavelength), and R31, R32, . . . may reflect only the light with a wavelength near $\lambda 3$. When the partial reflection units have wavelength selectivity, if the loss of the wavelengths other than $\lambda 1$ can be made relatively small, the observable ranges of $\lambda 2$ and $\lambda 3$ expand and wavelength ranges of the cable F1 other than $\lambda 1$, $\lambda 2$, and $\lambda 3$ may be easily used for other purposes such as communication.

The effects of the above passive branch (by the WDM coupler) will be described. First, there is a first effect of the branch configuration, just like in the passive branch (by the coupler). That is, the influence of a sensor cable failure when it occurs can be made limited.

When the passive branch by the WDM coupler is compared with the passive branch by the coupler, the optical coupler branch has an advantage that there is no need to increase the number of OTDRs, whereas it has a disadvantage that the observable range becomes short due to loss accompanied with branches. Further, when the number of branches and the number of reflection points are large, it is possible that the correspondence between the branch lines and the reflecting points may not be correctly perceived, which may lead to erroneous observation. That is, although the branch configuration can be achieved, its scale is somewhat limited.

On the other hand, although the passive branch by the WDM coupler has a disadvantage that a plurality of OTDRs are required, it is possible to manage cables that are physically branched as if they are cables independent from one another, and thus an error due to confusion is unlikely to occur. Further, since the loss in the branching part can be made small, it is possible to prevent the observable range from being decreased. That is, it becomes possible to provide a passive branch with a higher degree of design freedom in the configuration by the WDM coupler than in the configuration by the coupler. In the following description, this is referred to as a second effect of the branch configuration.

Figure 18:
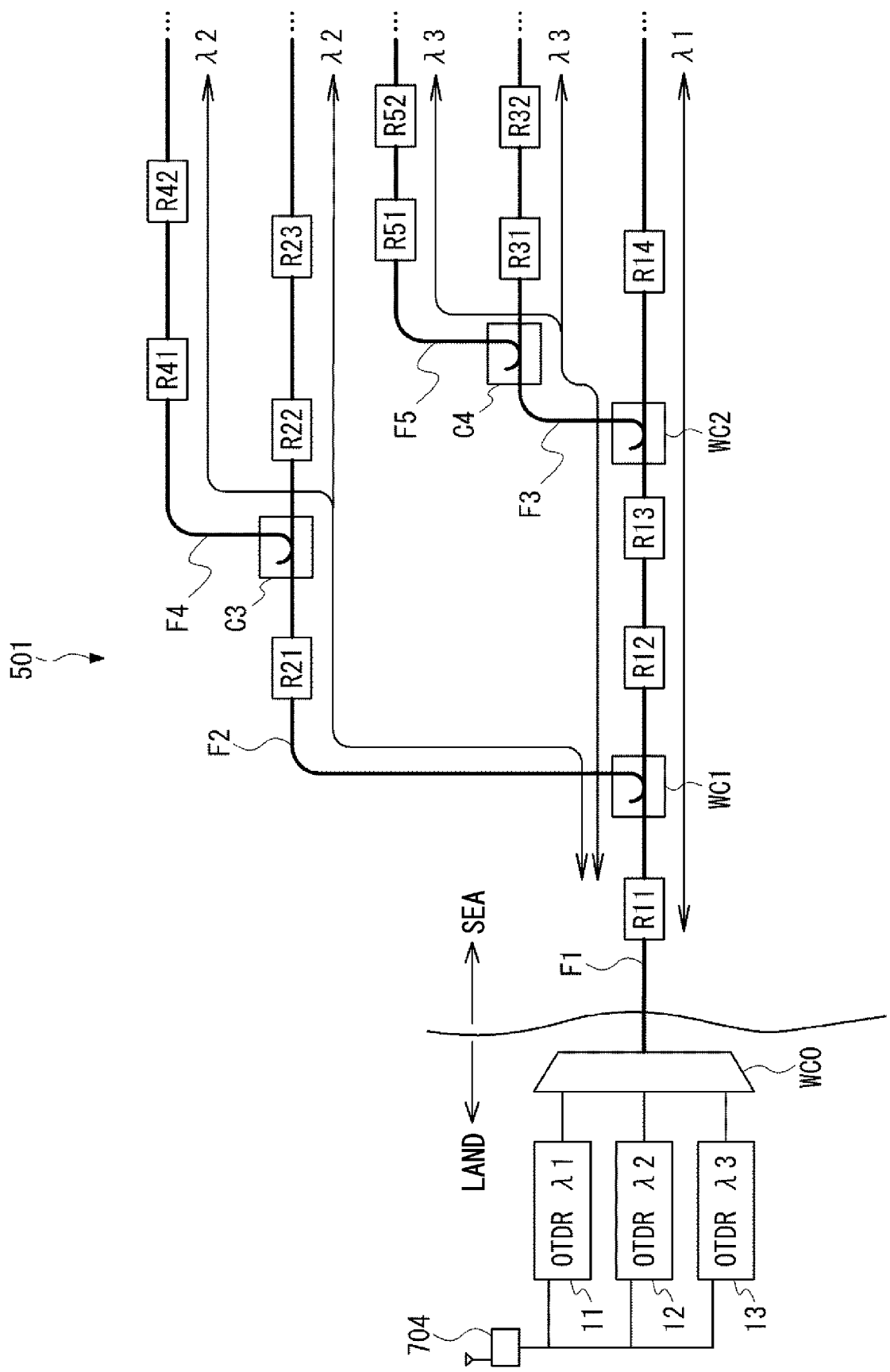
FIG. 18 is a diagram schematically illustrating a configuration of a modified example of the surveying system according to the fifth example embodiment.

The third and fourth example embodiments may be implemented in combination with each other. One example thereof is illustrated in FIG. 18. Since the content thereof is the same as those described in the third and fourth example embodiments, the descriptions thereof will be omitted. While optical coupler branches (branches by optical couplers C3 and C4) are provided beyond the wavelength branches in the example illustrated in FIG. 18, this is merely an example. The wavelength branches may be provided beyond the optical coupler branches.

Sixth Example Embodiment

In the aforementioned example embodiments, it is impossible to provide an optical amplifier in the communication path. This is because, in general, an optical amplifier allows light to pass in only one direction, which means reflected return light is blocked in the optical amplifier and OTDR measurement cannot be performed. If the optical amplifier cannot be used, the range that can be surveyed is limited to a place near the land and it is impossible to observe a desired area.

Figure 19:
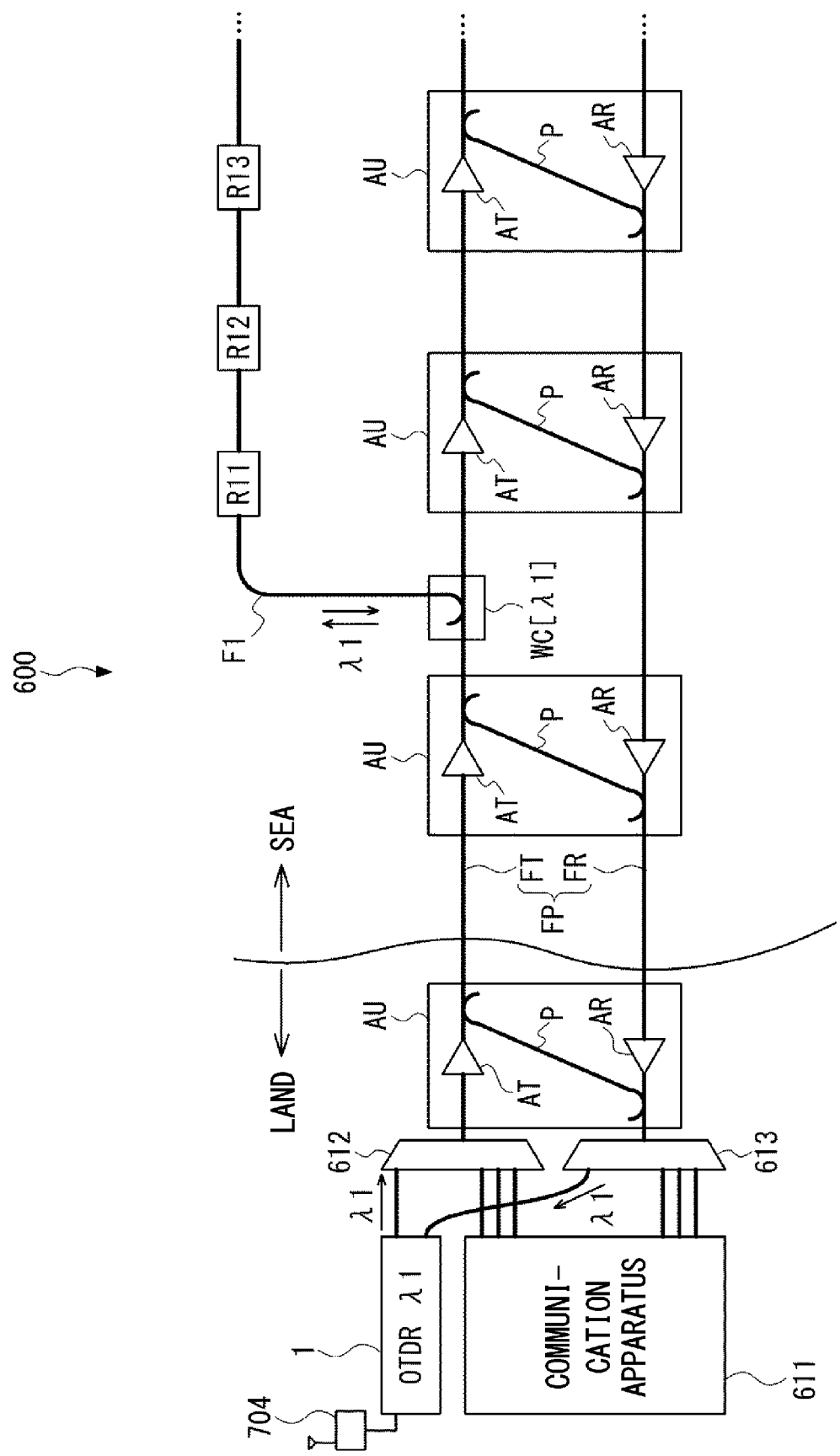
FIG. 19 is a diagram schematically illustrating a configuration of a surveying system according to a sixth example embodiment.

In order to solve the above problem, in the following, means for achieving observation of an area away from land using an optical amplifier will be described. FIG. 19 schematically illustrates a configuration example of a surveying system 600 according to a sixth example embodiment. The surveying system 600 is an example of attaching a surveying system to an undersea optical cable system used for data transmission. The method of the branch is a passive branch (by a WDM coupler). That is, this example is an explanation of a technique for applying the optical amplifier to the fifth example embodiment.

As described above, the optical amplifier allows light to transmit in only one direction. Therefore, in a communication cable including the optical amplifier, an uplink optical fiber and a downlink optical fiber are referred to as a pair.

In the undersea optical cable system, a fiber pair FP including an uplink optical fiber FT (a third optical fiber) and a downlink optical fiber FR (a fourth optical fiber) is provided. A communication apparatus 611 that is not directly related to this surveying system is connected to the optical fiber FT via a wavelength multiplexer 612 and is connected to the optical fiber FR via a wavelength separator 613. As the wavelength multiplexer 612 and the wavelength separator 613, for example, an Arrayed Waveguide Grating (AWG) or a Wavelength Selective Switch (WSS) are generally used.

In this configuration, an OTDR device 1 that outputs a pulse light having a wavelength $\lambda 1$ is also connected to the optical fiber FT via the wavelength multiplexer 612 and connected to the optical fiber FR via the wavelength separator 613. Accordingly, the OTDR device 1 is able to output the pulse light to the optical fiber FT and receive the return light from the optical fiber FR. The wavelength band for the OTDR device 1 and the wavelength band for the communication apparatus 611 are separately allocated.

The fiber pair FP is provided with one or more optical amplification repeaters AU in order to compensate for the loss of an optical signal to be transmitted. Each of the optical amplification repeaters AU is provided with an optical amplifier AT that amplifies light transmitted through the uplink optical fiber FT and an optical amplifier AR that amplifies light transmitted through the downlink optical fiber FR. Further, the optical amplification repeater AU is provided with a path P that branches return light such as reflection light that propagates through the uplink optical fiber FT in the opposite direction and couples the branched light to the downlink optical fiber FR. In the path P, for example, the return light is branched by an optical coupler provided on the input side of the optical amplifier AT, and the return light is coupled to the downlink optical fiber FR by the optical coupler provided on the output side of the optical amplifier AR via the optical fiber. In the following, the optical amplification repeater AU, the path P, the optical fiber FT, and the optical fiber FR form an optical amplification repeater system for amplifying and transmitting light.

Further, a WDM coupler WC is provided in a desired position of the optical fiber FT, however, actually, in the output of the optical amplifier in such a manner that it is integrated with the optical amplification repeater AU. The WDM coupler WC branches the pulse light of the wavelength $\lambda 1$, and outputs the branched light to an optical fiber F1 for surveying the movement of the ground. Further, return light from the optical fiber cable F1 is coupled to the optical fiber FT by the WDM coupler WC, and then coupled to the optical fiber FR via the path P in the optical amplification repeater AU. After that, the return light is branched by the wavelength separator 613, and returns to and is received by the OTDR device 1. Accordingly, the OTDR device 1 is able to survey the section from land to the optical fiber F1.

Figure 20:
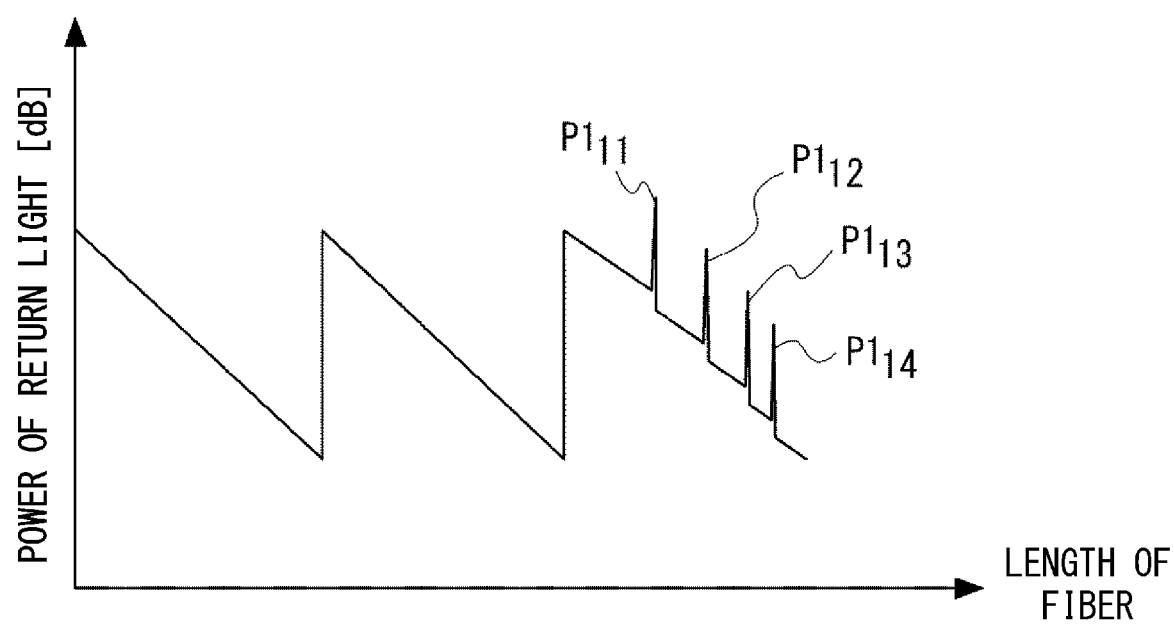
FIG. 20 is a diagram illustrating results of monitoring an optical fiber by the surveying system according to the sixth example embodiment.

FIG. 20 illustrates results of monitoring the optical fiber F1 by the surveying system 600. As illustrated in FIG. 20, in the surveying system 600, the transmission loss is periodically compensated by the optical amplification repeater AU. Therefore, a periodic sawtooth waveform appears. The peaks of the reflection light by the partial reflection units R11 to R14 are observed as reflection peaks in a part beyond the WDM coupler WC. Accordingly, by measuring the positions of the reflection peaks on the first and second measurement days, the movement of the ground can be detected, like in the aforementioned example embodiments.

While the path from land to reach the optical fiber F1 is also included in the OTDR measurement in this example, it contributes little to the survey. While it is possible to cause this path to contribute to the survey by incorporating a partial reflection unit of $\lambda 1$ into the middle of the path, it is not preferable because it may affect the communication on the side of the communication apparatus 611 that shares the cable.

Needless to say, it is also possible to apply the passive branch by the coupler after entering the branch cable of the optical fiber F1 in FIG. 19.

While the only wavelength used for the OTDR survey is $\lambda 1$ in the example in FIG. 19, it is needless to say that a plurality of wavelengths may be allocated to this surveying system in such a way that the optical amplifier is applied to FIG. 18 to further apply the passive branch by the WDM coupler.

According to the configuration as illustrated in this example, the optical amplifier may be applied to this surveying system, whereby it is possible to survey a place away from land.

Seventh Example Embodiment

Figure 21:
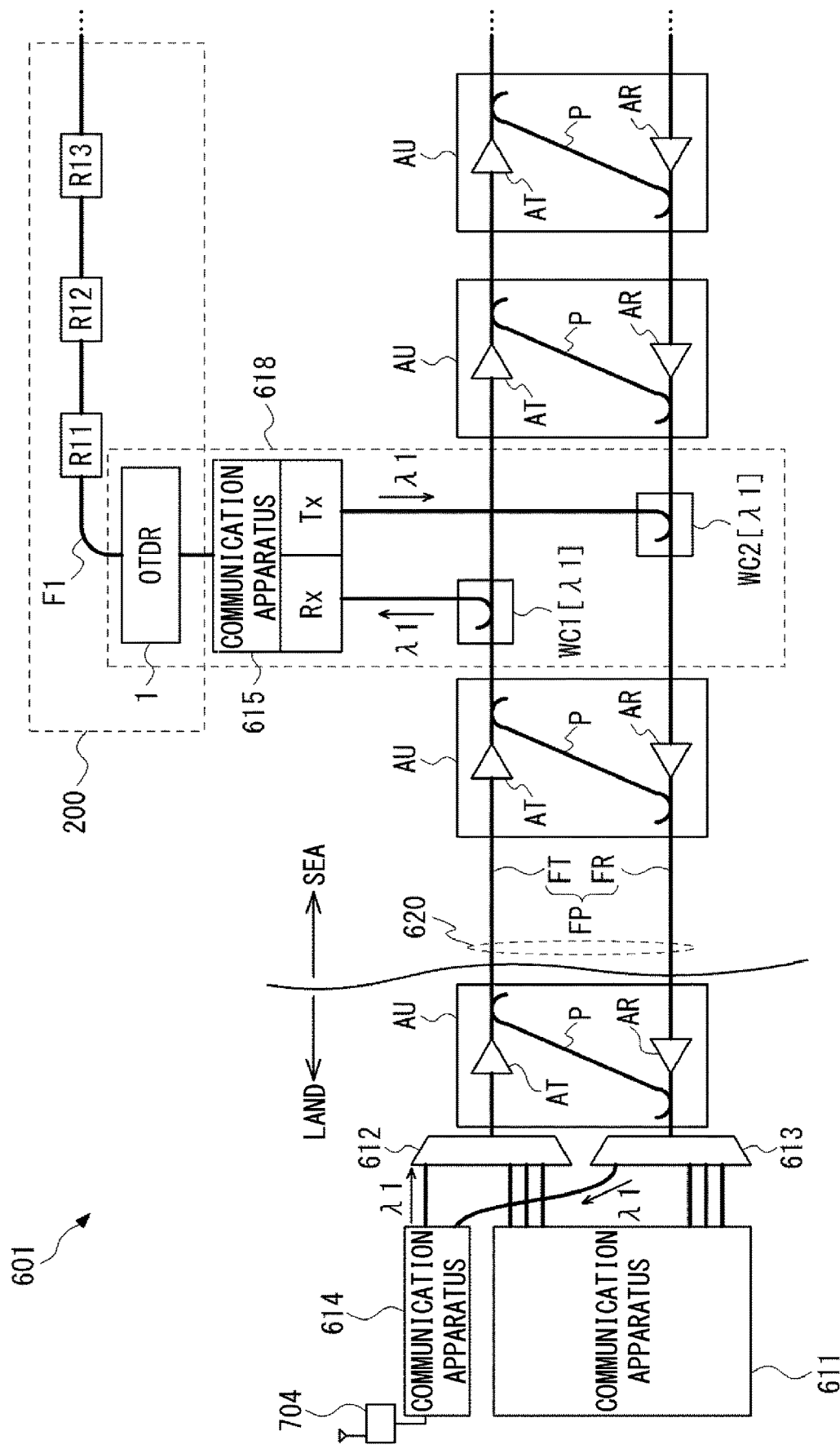
FIG. 21 is a diagram schematically illustrating a configuration of a surveying system according to a seventh example embodiment.

While it is possible to apply the optical amplifier and to observe an area far away from land according to the sixth example embodiment, this configuration has a disadvantage that unnecessary measurements are made many times since sections that are of less interest are also included in the OTDR measurement, as illustrated in FIG. 20. In order to solve this problem, in a seventh example embodiment, means for achieving an observation network in which an area to be observed is narrowed down by installing an OTDR device on the seabed is provided. FIG. 21 schematically illustrates a configuration of a surveying system 601 according to the seventh example embodiment. The surveying system 601 is a modified example of the surveying system 600 according to the sixth example embodiment.

The surveying system 601 is also an example of implementation in which a surveying system is attached to the undersea optical cable system used for data transmission. A method of an Optical Add-Drop Multiplexer (OADM) node in the wavelength multiplexing communication system is used to achieve branches. Components such as an OTDR installed in the land station of this surveying system stated above are provided in the OADM branch node. That is, a configuration in which an overhang station is installed on the seabed is provided.

As described above, since it is required for an active device such as an OTDR to receive power from a cable in order to install and drive this active device on the seabed, this branch configuration is referred to as an active branch. In this configuration, communication between land and the active branch apparatus is the same as a general wavelength path. Therefore, the description of the method of achieving this communication will be omitted.

An example illustrated in FIG. 21 will be described. Since the components of the undersea cable communication system (a communication apparatus 611, a wavelength multiplexer 612, and a wavelength separator 613), an optical amplification repeater AU, a fiber pair FP and the like are the same as those illustrated in FIG. 19 and the components such as an OTDR device 1, an optical fiber cable F1, and partial reflection units R11, R12, and R13 are also similar to those in the example of the surveying system described above, the descriptions thereof will be omitted.

At an overview level, an OADM branch node 618 is provided in the middle of the undersea communication cable, and a sensor cable is branched from the OADM branch node 618. That is, the OADM branch node corresponds to an apparatus that is called a Branching Unit (BU) in the undersea cable communication system.

What the BU and the OADM branch node have in common are insulation and water pressure resistance. In order to enable the OTDR and the communication apparatus to be installed on the seabed, the OADM branch node needs to be designed to save power, needs to be able to dissipate heat through a pressure-resistant housing, and needs to have a mounting design that guarantees absolute insulation between the power feeding line potential and the ground potential.

The difference between the BU and the OADM branch node is that the OADM branch node does not feed power to a cable beyond a branching part. While an extremely difficult technique regarding the branch of the power feeding line is required in a general BU, in this surveying system, there is no need to supply power to the sensor cable and therefore there is no burden on it. Therefore, there is no need to provide equipment related to power feeding switch, which occupies most of the space in a housing where various components can be accommodated in a general BU, which means that this space can be used to accommodate the OADM branch node and it is possible that the optical amplification repeater AU may also be accommodated therein. It is also possible to provide earthquake sensors such as an acceleration sensor. If optical amplification relay is required on a cable beyond the branching part, it is desirable to branch and extend the cable with a BU for communication and provide a branch BU with the sensor cable on a cable beyond the branching part.

Figure 22:
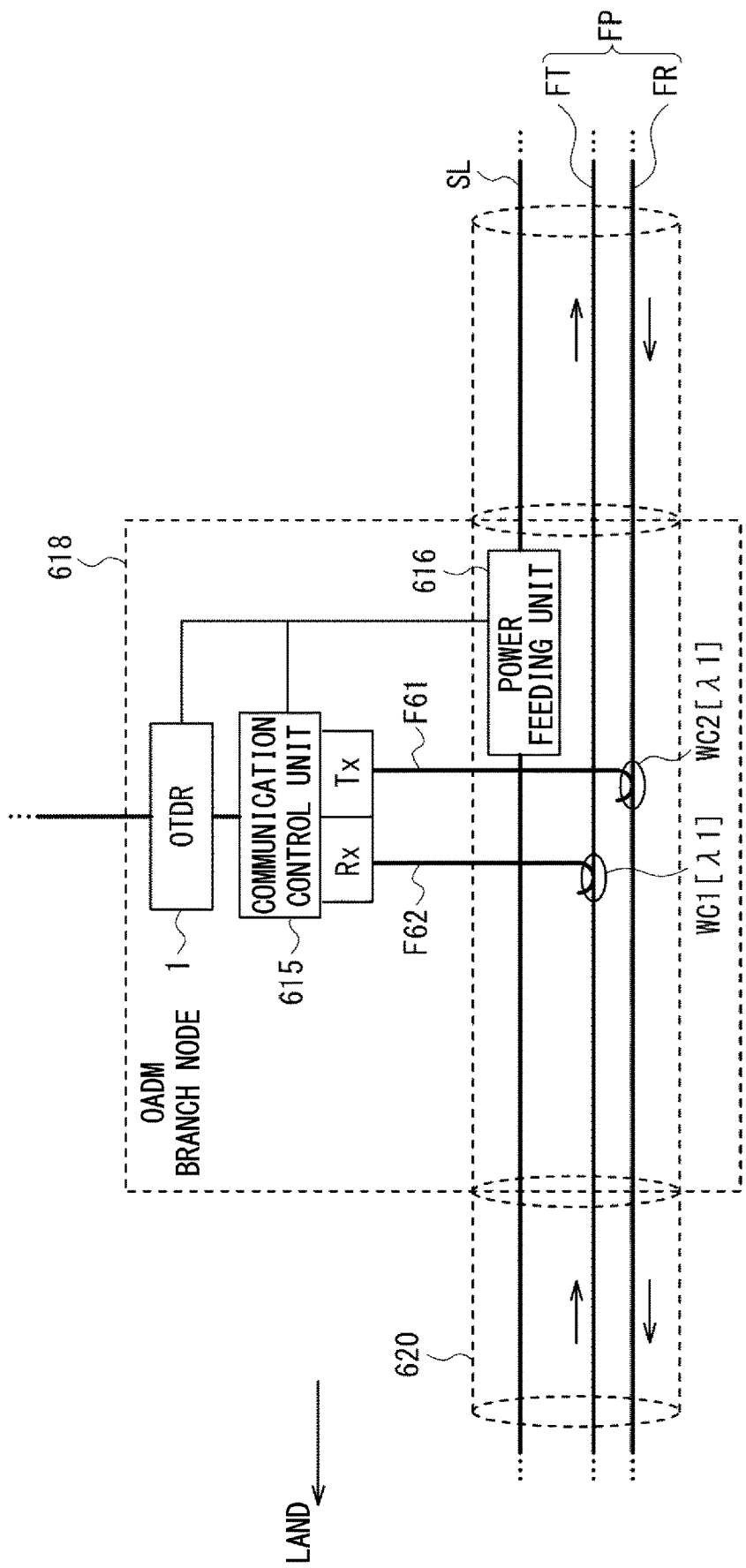
FIG. 22 is a diagram schematically illustrating a configuration of an OADM branch node.

Since the power feeding line in the cable and the power receiving and power feeding functions in each apparatus are not illustrated in FIG. 21, FIG. 22 illustrates the OADM branch node 618 extracted from FIG. 21 together with the power feeding relation, and the content thereof will be described.

In the OADM branch node 618, a specific wavelength (in FIG. 19, $\lambda 1$, third wavelength) among signal lights that are transmitted using wavelength multiplexing in a trunk cable 620 is added/dropped. The OADM branch node 618 includes optical couplers WC1 and WC2 having wavelength selectivity with respect to the light of the wavelength $\lambda 1$. A communication control unit (communication apparatus) 615 (this is also referred to as a second communication apparatus) that manages (control) the OADM branch node is connected via an optical transceiver. Here, Tx and Rx are respectively abbreviations for Transmitter and Receiver. This Tx can be transmitted with the wavelength $\lambda 1$. This communication control unit constantly communicates with 614, which is an opposing apparatus on the land side, through the wavelength path of the wavelength $\lambda 1$. Specifically, an optical signal of the wavelength $\lambda 1$ (a first optical signal) output from the communication apparatus 614 propagates through an optical fiber FT, is demultiplexed from the optical fiber FT by the optical coupler WC1 (a first optical coupler), and is received by the Rx (a first reception unit). An optical signal of the wavelength $\lambda 1$ (a second optical signal) output from the Tx (a first transmission unit) is multiplexed with the optical fiber FR by the optical coupler WC2 (a second optical coupler) and is received by the communication apparatus 614. The OTDR device 1 surveys the sensor cable and passes the results of the survey to the communication control unit 615. The power feeding unit 616 receives power from a power feeding conductor SL and feeds power to the communication control unit 615 or the OTDR device 1.

The communication apparatus 614 (this apparatus is also referred to as a first communication apparatus) has an important role of constantly transmitting, besides various control signals, a clock from a high-precision clock supply unit to the OTDR placed on the seabed. This is because, in the sea, radio waves from a Global Navigation Satellite System (GNSS) satellite, which is a high-precision clock source, cannot be received. The data measured by the OTDR device 1 on the seabed is transmitted to the communication apparatus 614 in the land via the communication control unit 615.

Figure 23:
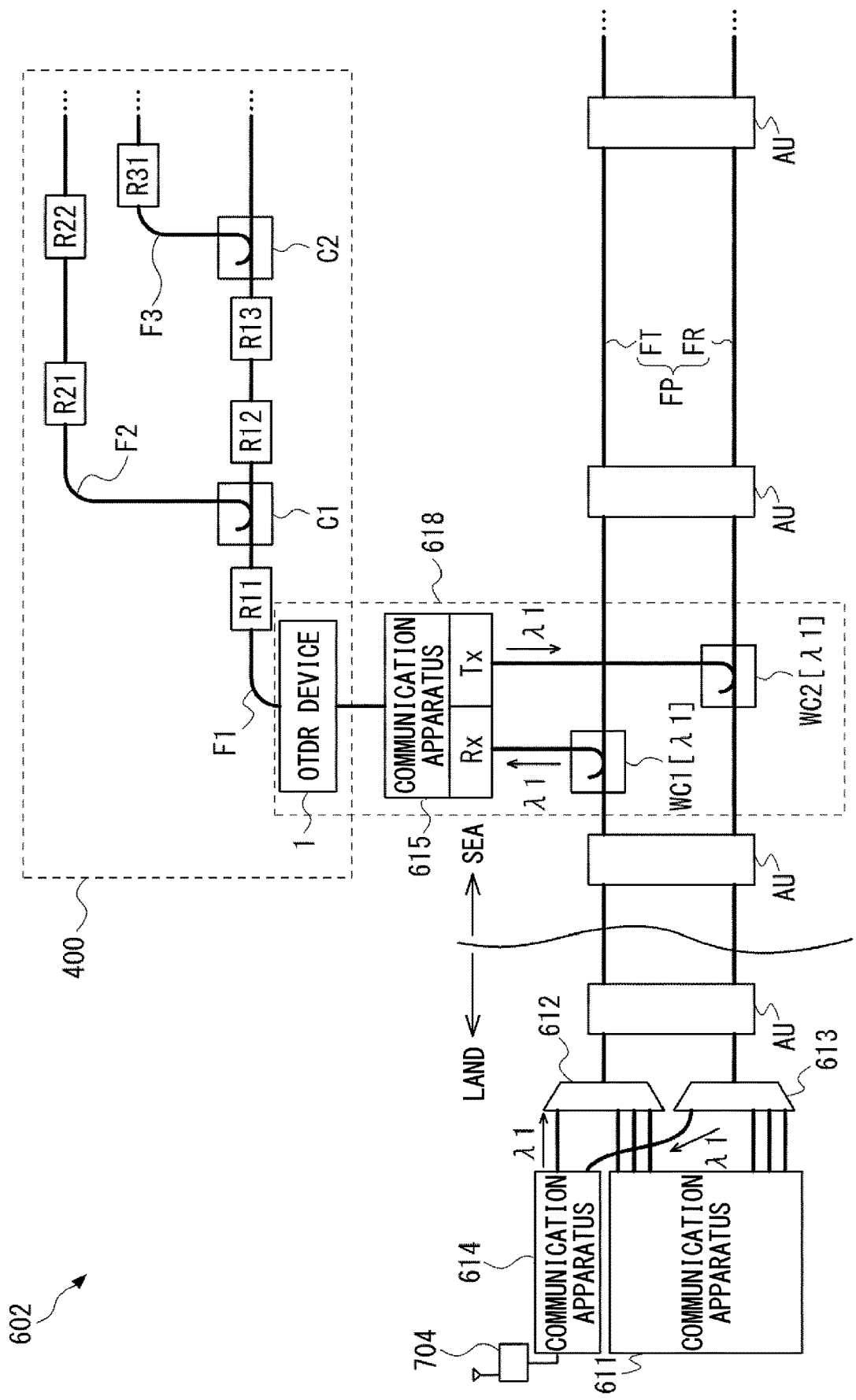
FIG. 23 is a diagram schematically illustrating a configuration of a modified example of the surveying system according to the seventh example embodiment.
Figure 24:
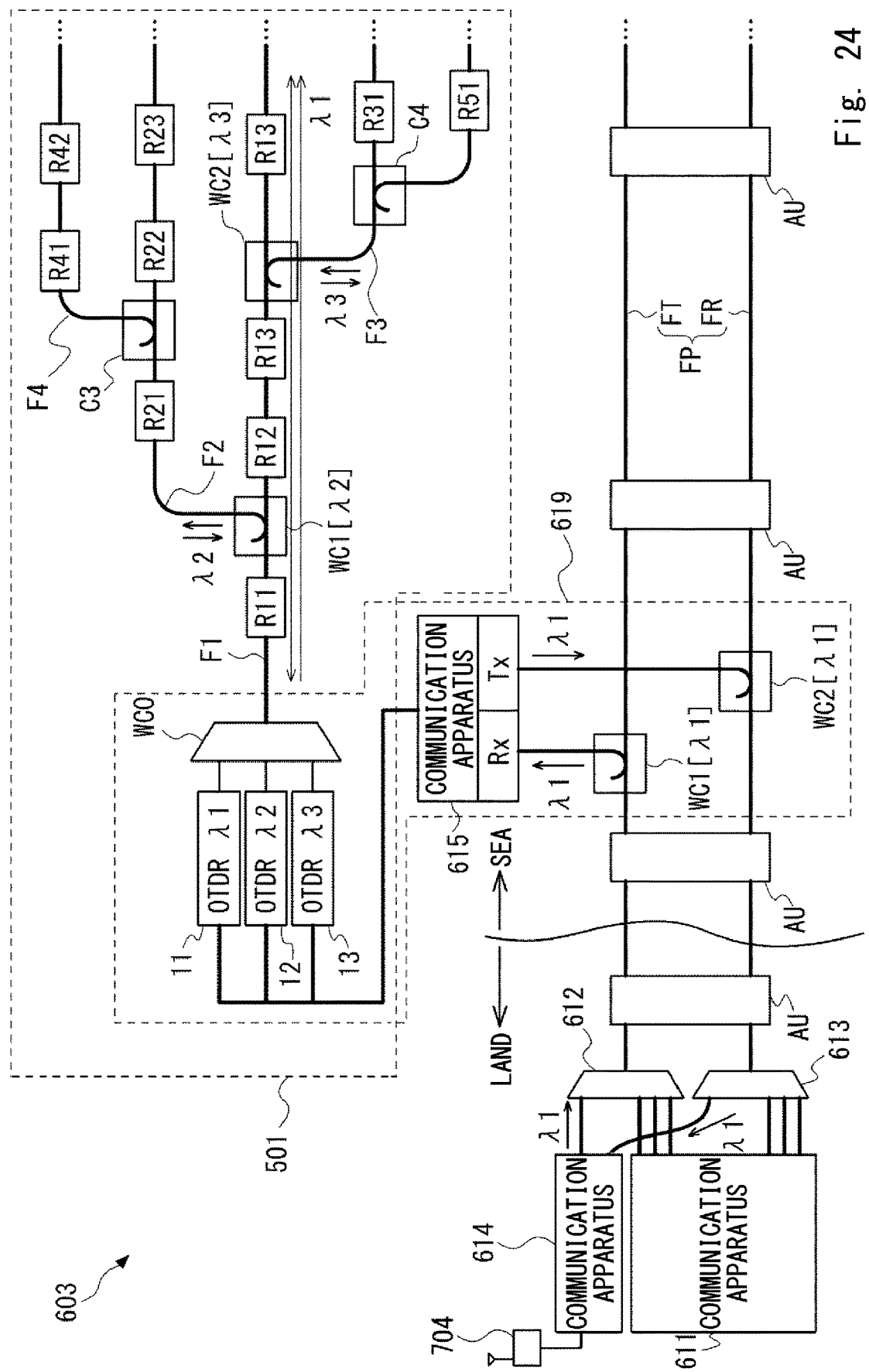
FIG. 24 is a diagram schematically illustrating a configuration of a modified example of the surveying system according to the seventh example embodiment.

While the surveying system 601 has been described to include the surveying system 100 in the amplifying repeater optical transmission system, the surveying system 601 may be configured to include surveying system 400 or 500 having a branch configuration, or a surveying system 501 including both the surveying systems 400 and 500 in place of the surveying system 100, as illustrated in FIGS. 23 and 24. Note that the surveying system including the surveying system 500 having a branch configuration is not illustrated. In a surveying system 603, the OADM branch node 618 of the surveying system 602 is replaced by an OADM branch node 619. The OADM branch node 619 has a configuration in which the OTDR device 1 of the OADM branch node 618 is replaced by OTDR devices 11 to 13 and a wavelength demultiplexer WC0 included in the surveying system 500. In this case as well, it is sufficient that the number of communication apparatuses 615 and the number of transmission/reception units be one. It is possible to distribute a synchronous clock to a plurality of OTDRs, collect the survey data, time-division multiplexes the data with signals of one wavelength $\lambda 1$, and transmit the signals that have been subjected to time-division multiplexing to the communication apparatus 614.

Eighth Example Embodiment

Figure 25:
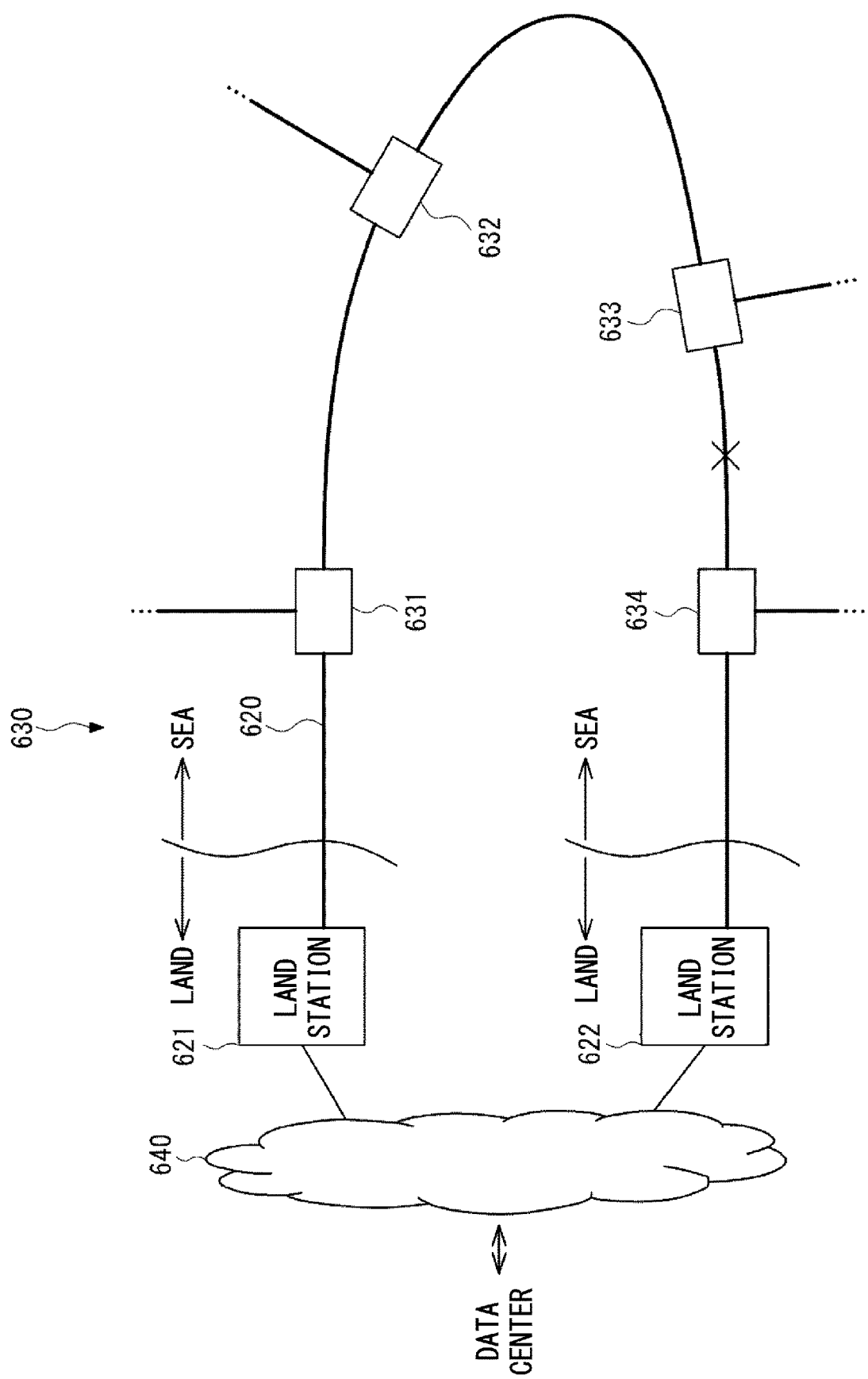
FIG. 25 is a diagram illustrating an example in which a route redundant network is configured between each of OADM branch nodes and two land stations according to an eighth example embodiment.

In order to improve the availability for a failure in a trunk cable in an observation network including a plurality of OADM branch nodes separated from one another, it is possible to connect the respective ends of the trunk cable to two land stations to achieve a route redundancy (route diversity) configuration. FIG. 25 illustrates an example of implementation. FIG. 25 illustrates an example of a surveying system 630 in which OADM branch nodes 631 to 634 that correspond to an OADM branch node 618A are provided in a trunk cable 620.

Figure 26:
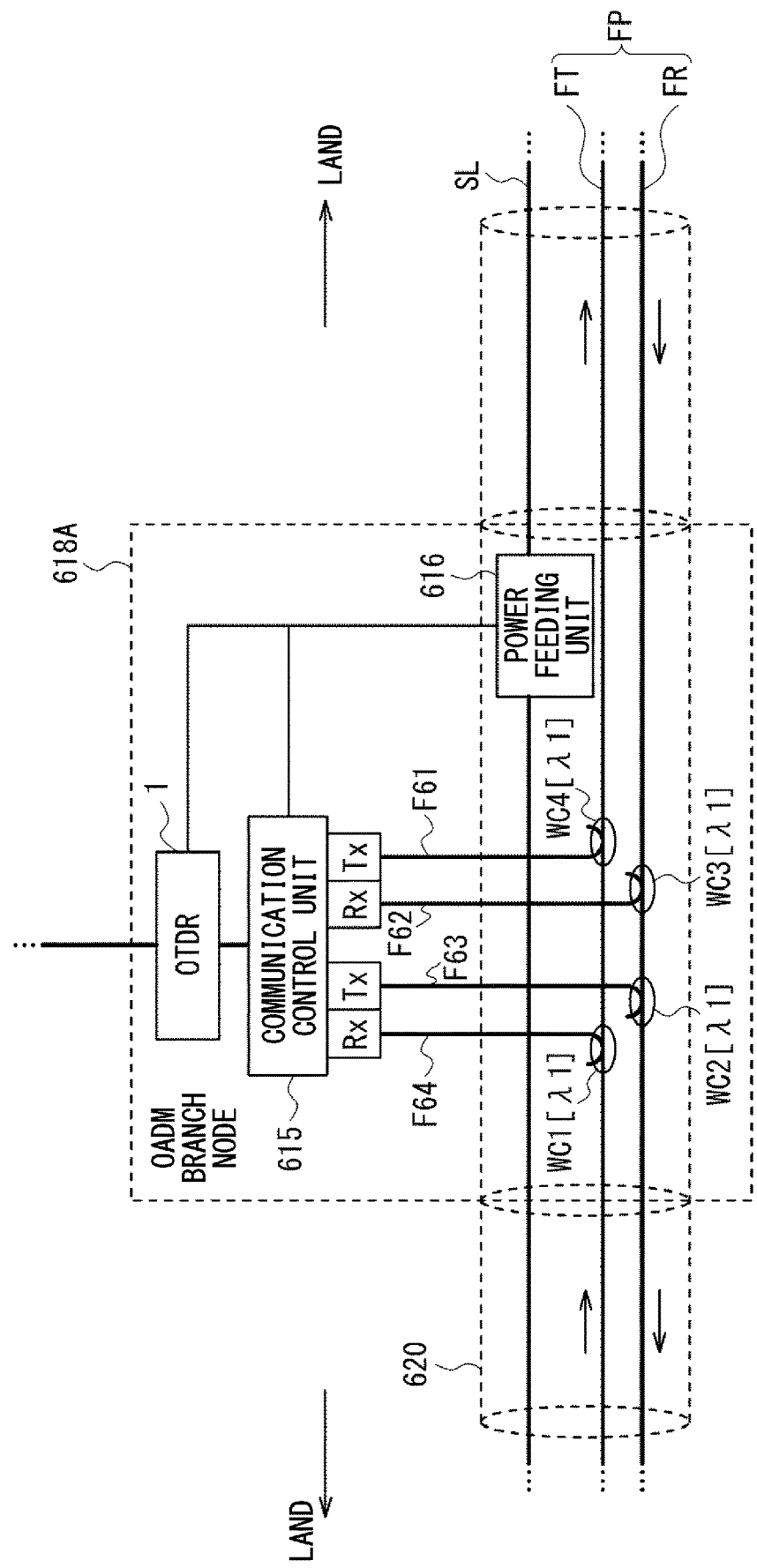
FIG. 26 is a diagram schematically illustrating a configuration of an OADM branch node that corresponds to the route redundant network configuration.

FIG. 26 illustrates a configuration example of the OADM branch node 618A. The OADM branch node 618A is a modified example of the aforementioned OADM branch node 618. As illustrated in FIG. 26, in the OADM branch node 618A, a communication control unit 615 includes two pairs of optical transmitters/receivers in such a way that the OADM branch node 618A is able to communicate with two land stations 621 and 622, and thus an OADM filter is expanded.

The OADM branch node 618A has a configuration in which optical couplers WC3 and WC4 are added to the OADM branch node illustrated in FIG. 22. In the OADM branch node 618A, two Tx and two Rx are provided in the communication control unit 615. The communication control unit 615 constantly communicates with communication apparatuses provided in the land stations 621 and 622, which are opposing apparatuses on the land side, through a wavelength path of a wavelength λ1. In this example, a communication apparatus 614 provided in the land station 621 is also referred to as a first communication apparatus and the communication apparatus 614 provided in the land station 622 is also referred to as a third communication apparatus.

An optical signal of a wavelength λ1 (a first optical signal) output from the communication apparatus (a first communication apparatus) of the land station 621 propagates through an optical fiber FT, is demultiplexed from the optical fiber FT by an optical coupler WC1 (a first optical coupler), and is received by one Rx (a first reception unit). An optical signal of a wavelength λ1 (a second optical signal) output from one Tx (a first transmission unit) is multiplexed with the optical fiber FR by an optical coupler WC2 (a second optical coupler) and is then received by the communication apparatus (a third communication apparatus) of the land station 621.

An optical signal of the wavelength λ1 (the third optical signal) output from a communication apparatus (a third communication apparatus) of the land station 622 propagates through an optical fiber FR, is demultiplexed from the optical fiber FR by an optical coupler WC3 (a third optical coupler), and is received by the other Rx (a second reception unit). An optical signal of the wavelength λ1 (a fourth optical signal) output from the other Tx (a fourth transmission unit) is multiplexed with the optical fiber FT by an optical coupler WC4 (a fourth optical coupler) and is received by the communication apparatus (the third communication apparatus) of the land station 622.

Accordingly, the OADM branch node 618A constantly communicates with both the land station 621 (the first observation station) and the land station 622 (the second observation station).

In the normal state, the two land stations 621 and 622 receive survey data from each of the OADM branch nodes 631 to 634 and transmit data to the data center via a data communication network 640. For example, survey data of the OADM branch node 631 reaches the land stations 621 and 622, each of which then transmits the survey data to the data center. In this way, the data center receives the same survey data in a duplicated manner. Therefore, in the normal state, these survey data pieces are both judged to be normal and aggregated into one piece of data, and then this data is recorded and processed.

According to this configuration, when, for example, a failure occurs in a cable at the location marked with the symbol x in FIG. 25, the data from the OADM branch nodes 631 to 633 reaches the data center via the land station 621 and the data from the OADM branch node 634 reaches the data center via the land station 622. That is, redundant communication paths are provided between the OADM branch nodes and the land stations. Further, by providing communication between each of the two respective land stations and the data center, the data center is able to detect that one communication has been interrupted although the same pieces of data should be normally delivered to the data center, and adopt, record, and process the other piece of data that has been delivered to the data center. According to this operation, it is possible to make the observation network strong against a cable failure and has an effect of improving availability.

Ninth Example Embodiment

An effect of the aforementioned active branch configuration will be described. To put it shortly, it is to be able to clearly separate the roles of the respective cables in the survey observation network. While an optical cable serves as both the sensor cable and the communication cable in the configuration in which an active branch is not used, the roles of them can be separated from each other by configuring the optical cable using an active branch. This is referred to as a third effect of the branch configuration.

A description will be given with reference to FIG. 27. In this survey observation network, there are two main types of optical fiber cables. One of them is applied to trunk cables or the like, and it is desirable to use a cable whose type is similar to that of a cable for communication from the economical point of view. This is referred to as a trunk specification cable type. The other one is a cable for a sensor. This is referred to as a sensor specification cable type.

On the other hand, the components of the cable of the observation network can be broadly classified into two types. One of them is a trunk cable 900, which is formed of the trunk specification cable type. This serves as a function of communication and power feeding, and is installed while avoiding areas with unstable terrain as much as possible. The optical fiber core wire therein is mainly used for the purpose of communication and is not mainly used for a sensor. From the economical point of view, it is desirable to use the cable, the connecting parts, and the connecting method the same as those of the communication cable.

The other components of the cable are branch cables 920 and 950. A branch cable includes a trunk specification cable type and a sensor specification cable type connected to each other. No power feeding line is included in the branch cable. Even when the branch cable includes a power feeding line, it is not used or not connected so that it is completely isolated from the power feeding line in the trunk cable 900. According to this configuration, it is possible to actively install the sensor cable in an area where there is a high risk of cables being damaged but it is required to preferentially make observation. This is because, if there is a failure in the cable to which the power feeding line is connected, this failure affects the entire observation network to which the power feeding line is connected.

Sensor specification cable type sections 925, 945, and 955 in each branch cable, which are cables for detecting expansion and contraction of the ground, each include a plurality of partial reflection units Rxx and have a coating that provides sufficient friction with the seabed. On the other hand, trunk specification cable type sections 921 and 951 in each branch cable are sections that achieves connection between the trunk cable and the branch cable.

Cables 923 and 953 branched from OADM branch nodes 902 and 905 on the trunk cable 900 are also of the trunk specification cable type, but they are completely insulated from the power feeding line in the trunk cable 900 as they do not include the power feeding line or even when they include the power feeding line, it is not used or not connected. These cables and sections formed of the trunk specification cable type on the side of the branch cables (replacement repair work assumed areas) 922 and 952 are connected to each other using the connecting parts or the connecting method of the trunk specification cable type.

Since there is a risk that a part of the sensor specification cable type included in the branch cables may be damaged, it is necessary to prepare a repairing method in advance. However, in the sensor specification cable type, the performance as a sensor should be emphasized. For example, the sensor specification cable type itself needs to be laid on with some tension left and friction between the sensor specification cable type and the seabed is important. When the cable is damaged and the survey can no longer be performed, it is expected that it will be difficult to pull up and repair the damaged part, and it is considered that it is realistically better to newly lay on a whole branch cable in place of the damaged cable. While the techniques, elements, construction methods and the like for pulling up the cable placed on the seabed onto the ship and connecting this cable with a new cable have already been established in communication cables (trunk specification cable type), it is not economical to newly prepare them for a cable of the sensor specification cable type.

In view of the replacement work stated above, a sufficient length of section of the trunk specification cable type is provided on the side of the OADM branch node of the branch cable. Further, a place where this construction can be conducted without any problem is provided as a route, where the cable can be laid on. In this construction, an anchor with a blade is run to intentionally cut a part in the vicinity of an obstacle point (Cutting Drive), a cable at a point slightly away from the cutting point is hooked on the anchor and pulled up onto the ship. Then, the damaged or immersed cable section is cut off, a spare cable for repair is inserted, reconnected, and returned to the seabed. A desired work area for this construction is a relatively flat and open area with few obstacles for conducting such a construction. This area is schematically illustrated in FIG. 27 as the replacement repair work assumed areas 922 and 952 on the branch cable side.

Figure 27:
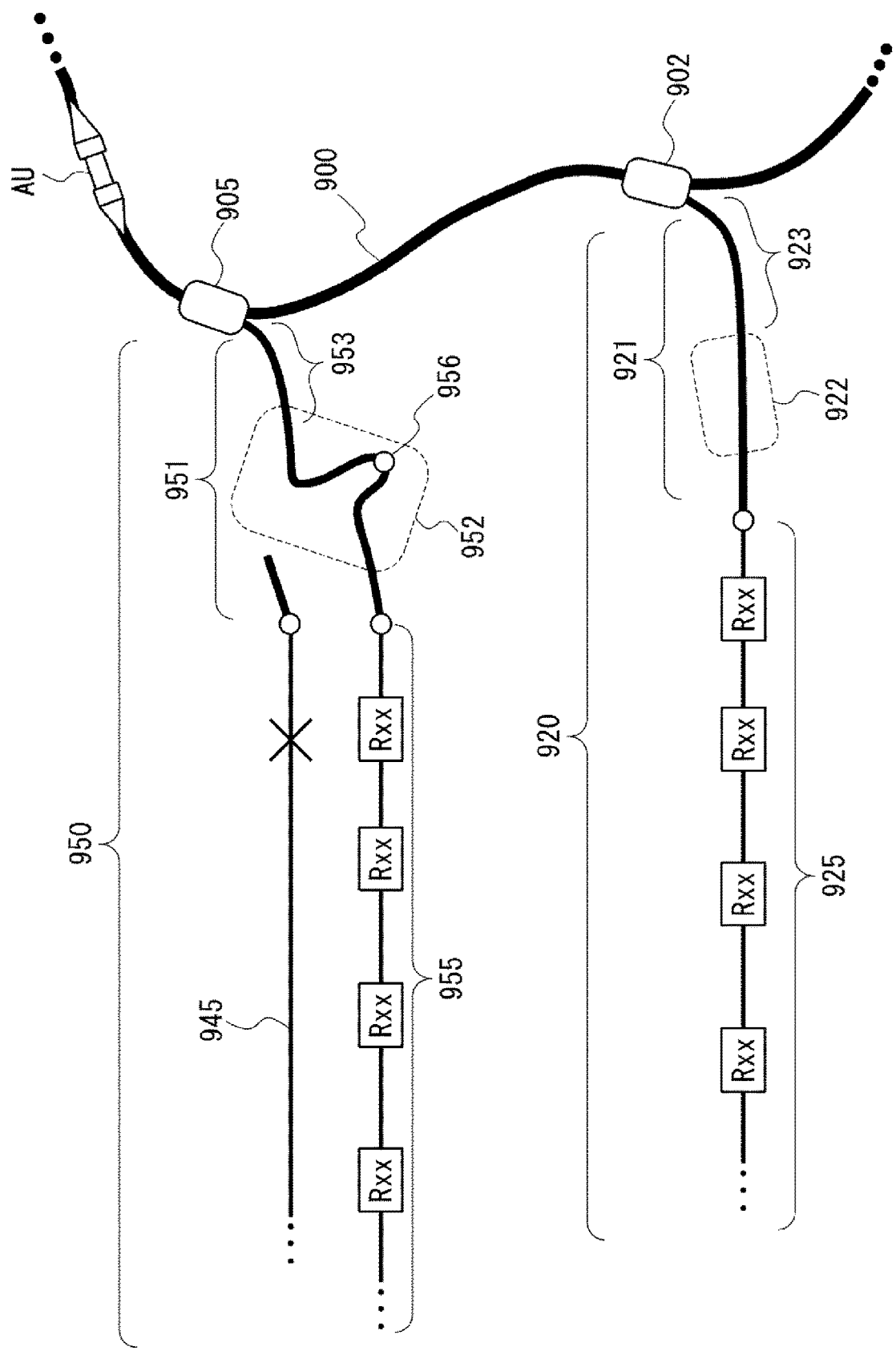
FIG. 27 is a diagram schematically illustrating an aspect of a cable for a sensor (a branch line cable) branched from a trunk cable according to a ninth example embodiment.

FIG. 27 illustrates a state after the branch cable 950 is replaced and repaired. In order to disconnect the sensor specification cable type section 945, where a failure occurs and therefore sufficient survey can no longer be performed, the sensor specification cable type section 945 and the cable 953 are disconnected from each other by an anchor operation, and a cable of the new sensor specification cable type section 955 and the cable 953 are connected to each other at a connection point 956, and then the connection point 956 is gently lowered to the seabed.

In the above work, the cut end of the cable 953 is temporarily pulled up onto the ship. If, in this case, the OADM branch node 905 moves since it is pulled, or if it is lifted up, there is a high possibility that a secondary failure will occur on the side of the trunk cable 900. In order to avoid these situations, the cable 953 needs to have a sufficient length. Specifically, it is desirable that the OADM branch node 905 be separated from the replacement repair work assumed area 952 by at least three to five times the depth of water.

By adopting the active branch configuration, it becomes easy to achieve such division of roles of cables, protect the trunk cable, and cover the observation area where there is a risk that the cable may be damaged. This is a survey observation network design in which the third effect of the branch configuration is maximized.

However, the idea conceived in this example embodiment, that is, the idea of properly using the sensor specification cable type and the trunk specification cable type is not limited to being applied to the active branch, and it may also be applied to the passive branch although its effects are limited.

It is needless to say that this configuration achieves the first effect of the branch configuration as well, that is, the influence of a cable failure when it occurs can be made limited compared to that in a single stroke configuration.

Tenth Example Embodiment

Figure 28:
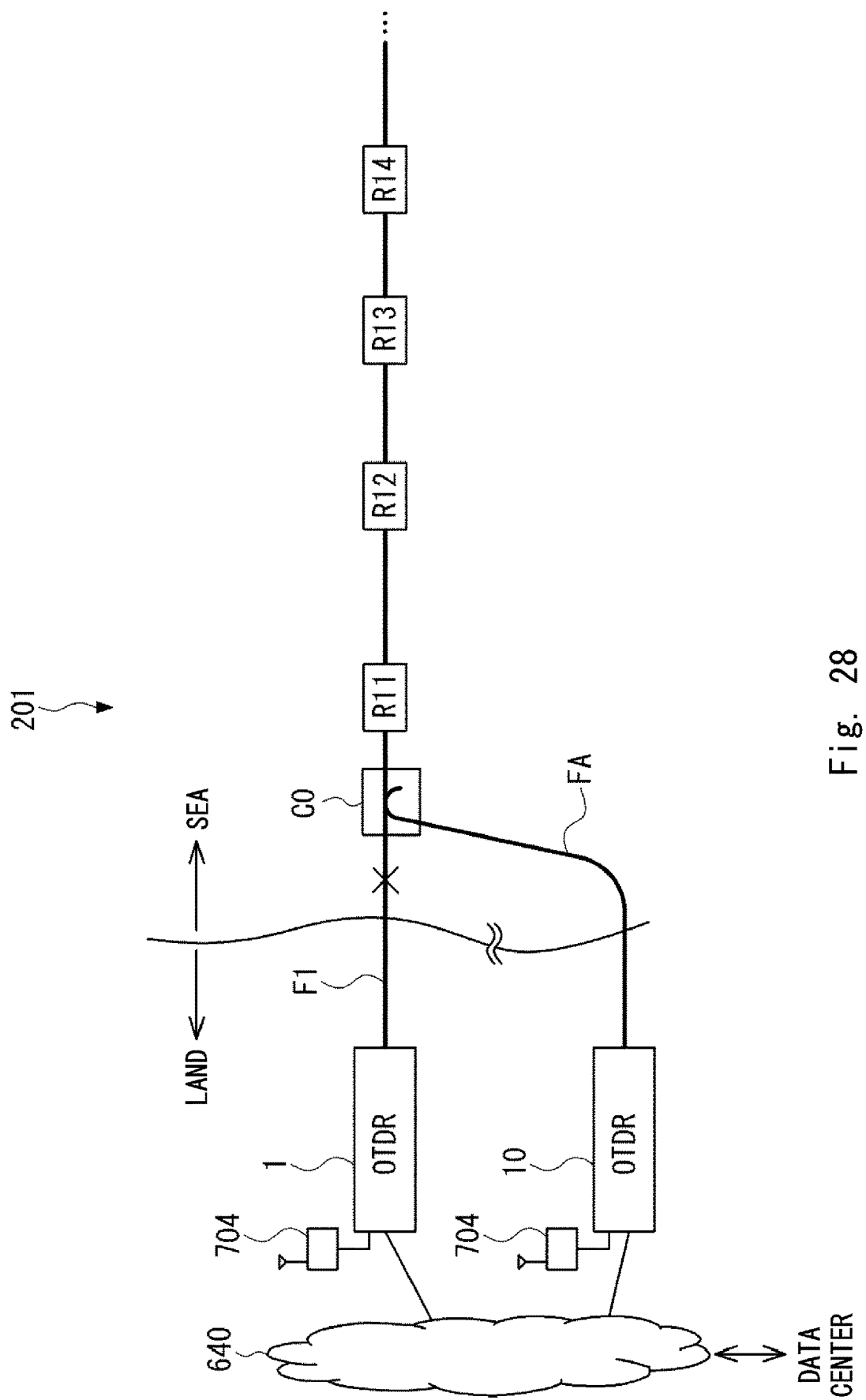
FIG. 28 is a diagram schematically illustrating a configuration example of a surveying system according to a tenth example embodiment.

In this example, a case in which a path into which a pulse light is input is made redundant in the surveying system 200 according to the second example embodiment will be described. FIG. 28 schematically illustrates a configuration of a surveying system 201 in which a redundant configuration is applied to the surveying system 200 according to the second example embodiment. In the surveying system 201, an OTDR device 10 (a second OTDR device) provided in another land station is added to the surveying system 200. The OTDR 10 and an optical coupler C0 are connected to each other via an optical fiber FA, and the optical fiber FA is coupled to an optical fiber F1 by an optical coupler C0. In this example, the OTDR device 1 is also referred to as a first OTDR device.

According to this configuration, when, for example, a failure occurs in the optical fiber cable F1 at the location marked with the symbol X in FIG. 28, the OTDR device 10 can be started up and measurement of return light can be continued. In this case, the distance from the OTDR device to each partial reflection unit apparently changes. However, only L01 has been actually changed and measurement in places beyond L12 is not changed and can be continued. While a redundant configuration formed of two paths has been described in this example, a redundant configuration formed of three or more paths may instead be applied.

Eleventh Example Embodiment

Non-Patent Literature 1 discloses a technique for grasping crustal deformation of the seabed by performing echo ranging on the seabed on the ship using a mirror transponder installed on the seabed and measuring the position of the ship using a positioning satellite (Global Navigation Satellite System: GNSS). This system is called a GNSS-echo ranging coupling system or a GPS/A system. In this system, a mirror transponder that receives an acoustic signal from the ship and sends a response acoustic signal is installed on the seabed in a fixed manner.

Figure 29:
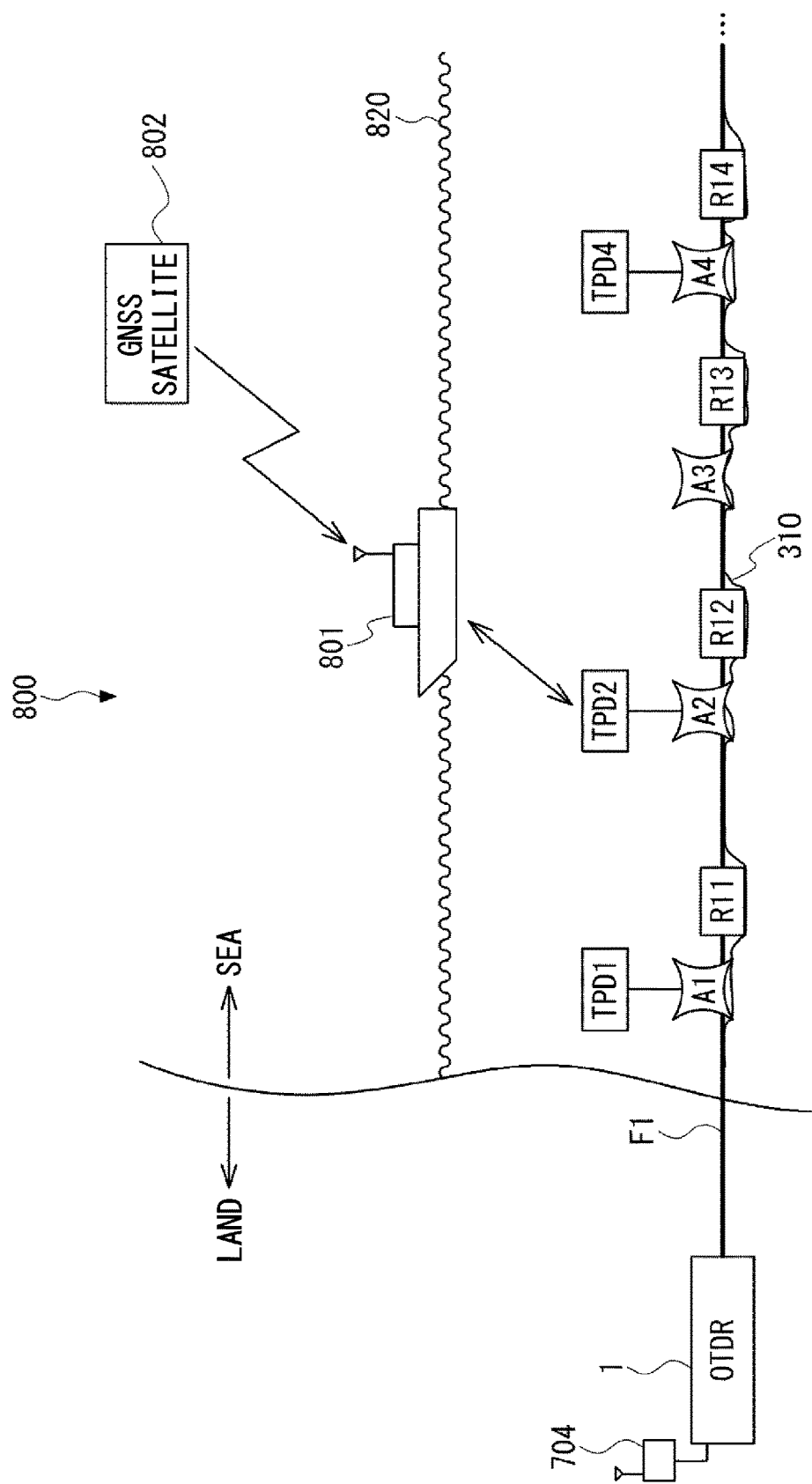
FIG. 29 is a diagram schematically illustrating a configuration of a surveying system according to an eleventh example embodiment.

In this configuration, by incorporating the mirror transponder function into some or all of the fixing members described in the third example embodiment, the absolute position of the fixing members can be grasped. FIG. 29 schematically illustrates a configuration of a surveying system 800 according to an eleventh example embodiment. As illustrated in FIG. 29, mirror transponders TPD1, TPD2, and TPD4 are respectively installed in fixing members A1, A2, and A4.

By surveying the position of the mirror transponder by an acoustic signal from a ship 801 on a sea surface 820 that receives radio waves from a GNSS satellite 802, like in the surveying system 800, it is possible to grant information on the absolute position in order to detect the movement of the ground according to this configuration.

Further, according to this configuration, it is possible to use the detection of the movement of the ground by the surveying system 800 and the absolute survey by the GNSS-echo ranging coupling system in a complementary manner. While the GNSS-echo ranging coupling system is advantageous in that it is possible to grasp the absolute position, it is difficult to achieve real-time performance and completeness. Further, it is also difficult to achieve high-precision measurement in the deep sea where the influence of fluctuations in underwater sound velocity is large. On the other hand, according to the detection of the movement of the ground in this configuration, although it is difficult to measure the absolute amount of expansion and contraction of the ground, it is possible to monitor multiple places in real time regardless of the depth of water. Therefore, the mutual complementation can be expected.

A driving power of the mirror transponder installed on the seabed may be fed from an undersea cable including an optical fiber and a power supply line. Although the driving power may be fed from the power supply line included in the undersea cable, since it is not desirable to include the power supply line in the optical fiber cable for sensing, it is preferable to send light energy via an optical fiber (optical fiber power feeding) to store electricity, thereby driving the mirror transponder.

Twelfth Example Embodiment

In the aforementioned configuration for measuring expansion and contraction of the ground can also measure a water pressure change in the same configuration. In the present example embodiment, first, water pressure change measurement in the surveying system 100 in FIG. 1 according to the first example embodiment will be described.

Figure 30:
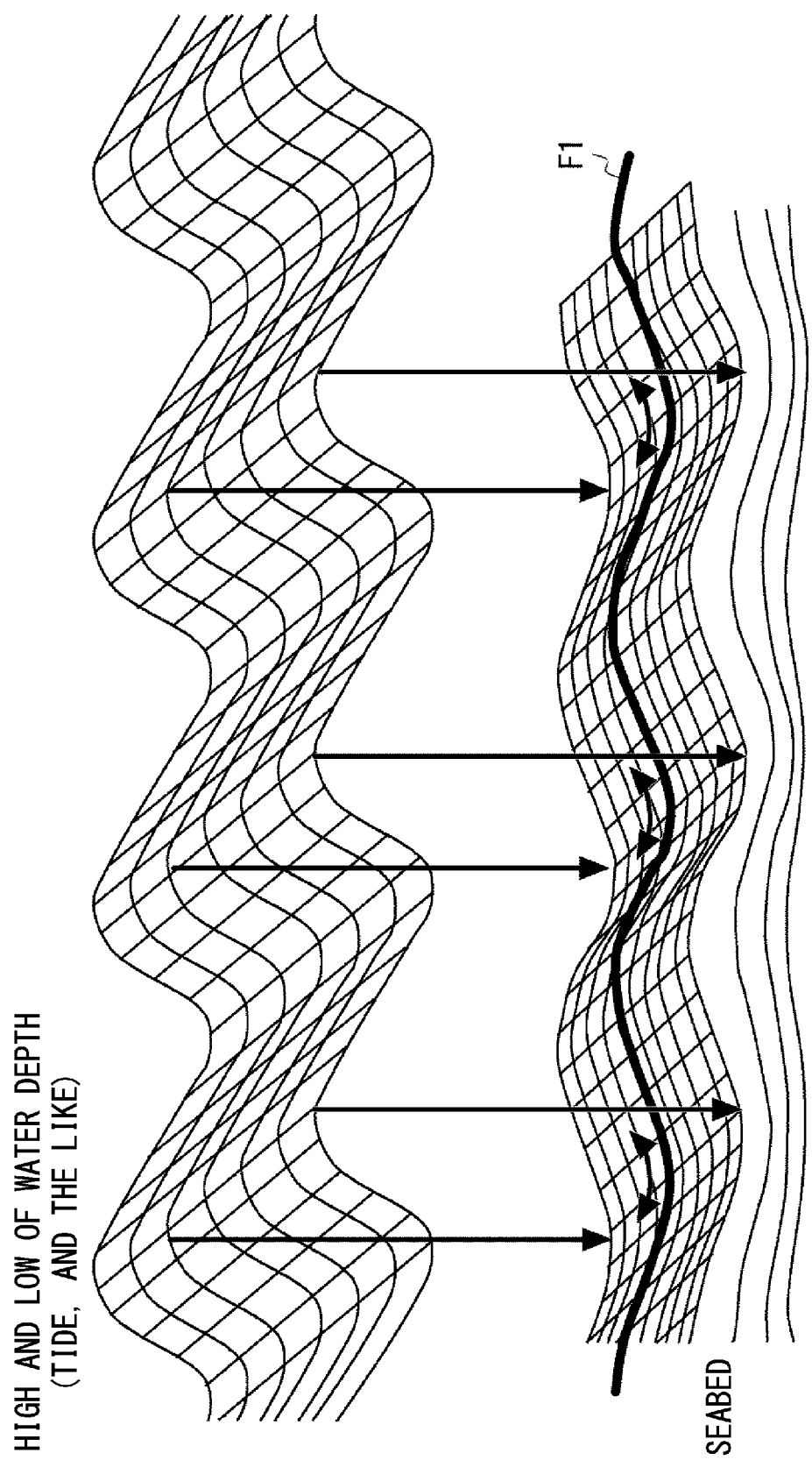
FIG. 30 is an explanatory diagram of a mechanism by which a submarine cable senses a water pressure fluctuation.

In the present example embodiment, it is assumed that an optical fiber cable F1 and a partial reflection unit R11 are installed on the seabed. Although the optical fiber cable F1 has a pressure-resistant structure having a strength sufficient to withstand a water pressure, a length of the optical fiber cable F1 is slightly extended as a result of being slightly compressed by the water pressure. In addition, the ground surface of the seabed is also expanded and contracted due to change in the water pressure, and when there is sufficient friction between the seabed and a cable, the cable is also expanded and contracted accordingly. FIG. 30 illustrates an image of a latter operation.

As illustrated in FIG. 30, the seabed surface is made elastic deformation by being pushed by the water pressure, and a manner of elastic deformation of the seabed also changes according to the change in the water pressure. Since the optical fiber cable F1 is laid on or buried in the seabed, expansion and contraction of the optical fiber cable F1 occur in a longitudinal direction due to deformation of the seabed surface. In order for this mechanism to work, friction between the optical fiber cable F1 and the seabed surface is required. Even when the optical fiber cable F1 is placed on the seabed surface, it naturally has friction, but when the optical fiber cable F1 is buried, it is considered that an area being contacted with the cable increases and the friction becomes easier to obtain.

Although an amount of expansion and contraction of the optical fiber cable F1 described herein is extremely small, the amount of expansion and contraction of the optical fiber cable F1 is sufficiently detectable with reference to a wavelength (typically about 1 μm) of light that is used for measurement and propagates through an optical fiber in the optical fiber cable F1.

As a result, the length of the optical fiber cable F1 changes slightly as the water pressure changes. When the length of the optical fiber cable F1 from an OTDR device 1 to the partial reflection unit R11 is accurately measured by using the OTDR device 1, a water pressure change is detected as a change in the length of the optical fiber cable F1. Note that, in the present example embodiment, as compared with the first example embodiment, only a cause of expansion and contraction of the optical fiber cable F1 is not crustal deformation but a water pressure change, a detection method is the same, and therefore the description of an operation relating to the detection of the length of the optical fiber cable F1 thereafter is omitted.

Figure 31:
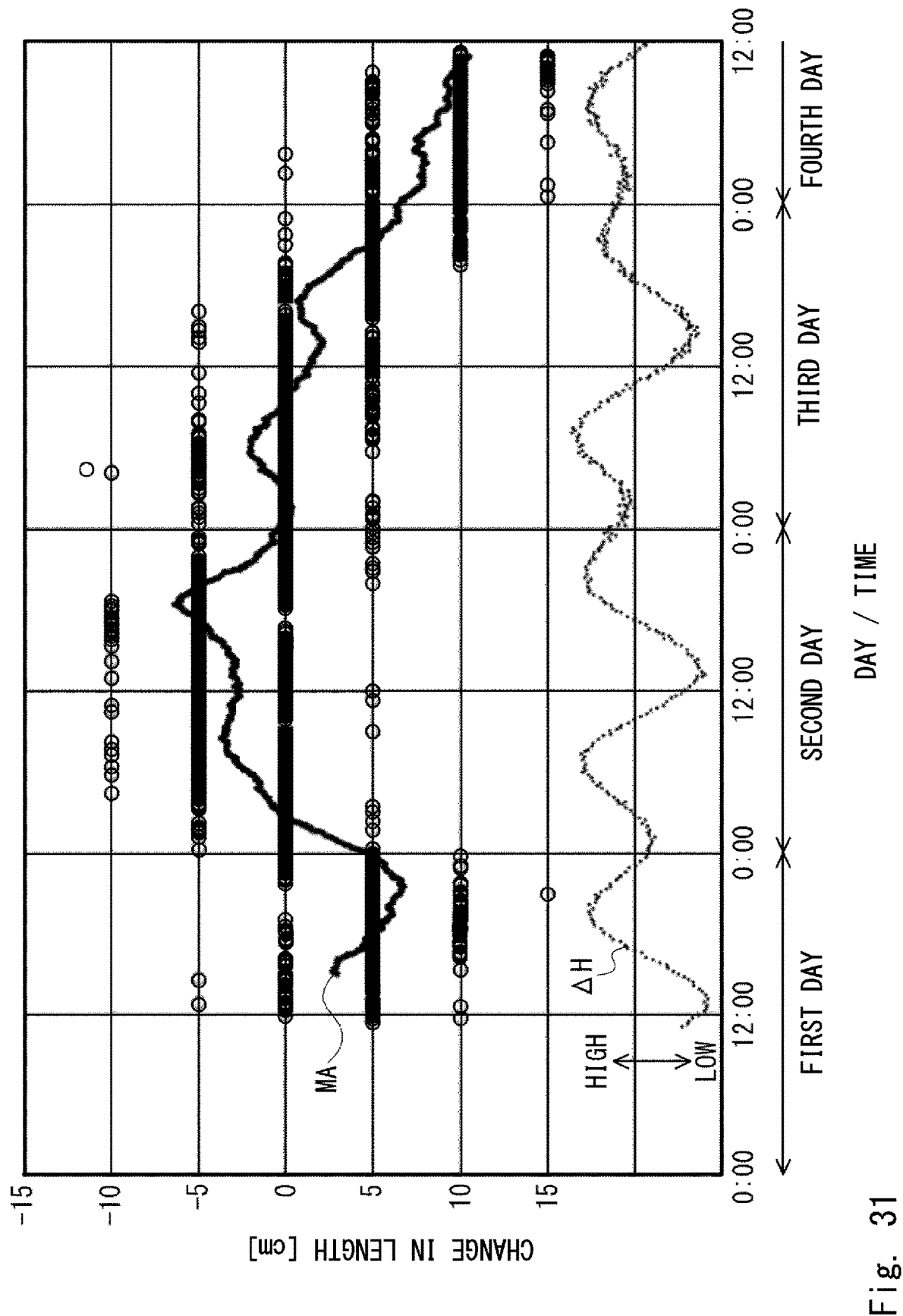
FIG. 31 is a diagram illustrating one example of a result of water pressure measurement according to a twelfth example embodiment.

FIG. 31 illustrates one example of a result of the water pressure measurement according to the twelfth example embodiment. In this measurement, the length of the cable from the OTDR device 1 to the partial reflection unit R11 is about 38 km. Of these, the cable section having about 11 km from a landing point is buried at a depth of about 1 m. A measurement resolution of the OTDR being used is 5 cm, and data with a resolution finer than 5 cm is obtained by measuring a plurality of times and obtaining a moving average thereof.

An upper side of a graph in FIG. 31 illustrates a change in cable length to the partial reflection unit R11. Each small circle illustrates a single measurement value of the cable length to the partial reflection unit R11, and the moving average thereof is illustrated by a bold curve MA. An average value of a continuous observation period of about 3 days is used as a reference value, and an amount of change from the reference value is taken as a vertical axis.

By checking the moving average curve MA, it can be seen that a cable length change of 10 cm or more appears. In this measurement, a measurement value fluctuation (drift) of the OTDR is not sufficiently eliminated, and a fluctuation other than the true cable length change is also included. However, it is understood that there is a considerable correlation between a tide level change ΔH at a cable neighborhood point illustrated by a dotted line on a lower side of the graph in FIG. 31 and the cable length change illustrated by the curve on the upper side of the graph. The tide level graph illustrates the high tide level at upper and the low tide level at lower.

From this, it can be seen that the length of the undersea cable changes not only in a slow change of several centimeters per year due to crustal deformation, but also in a relatively short time of several hours due to changes in water pressure such as a tide.

By using a configuration in which a plurality of partial reflection units are connected in series on an optical fiber cable, that is, by using the surveying system 200 according to the second example embodiment illustrated in FIG. 5, it is also possible to measure a water pressure change in units of installation sections of the partial reflection units.

As described above, a change in a water pressure can be detected from a change in a cable length, but in order to know an amount of the change in the water pressure, it is necessary to calibrate a coefficient at least for each cable section. This is because the coefficient by which the change in the water pressure is converted into the change in the cable length differs depending on a fixing method of the cable to the seabed, a cable structure, a type of covering, and the like.

As such a calibration means, for example, a tidal phenomenon as also illustrated in FIG. 31 can be used. Since a tidal appearance can be estimated for each sea area, it can be used for the calibration of this coefficient. That is, for example, a water depth change $\Delta H0$ at a high tide time and a low tide time in a sea area of a certain cable section is calculated (may be actually measured), and a water pressure change $\Delta P$ can also be calculated from the water depth change $\Delta H0$. On the other hand, by the aforementioned observation, it is possible to obtain a cable length change $\Delta L$ of the cable section between the high tide time and the low tide time. A ratio of the $\Delta L$ to the $\Delta P$ becomes the coefficient. By performing such a calibration operation for each cable section in advance, when an abnormal wave such as a tsunami occurs, the height can be obtained as a measurement value with less error. Note that, for example, as illustrated in FIG. 5, in a case where a plurality of partial reflection units are provided in one cable, the coefficient may be calculated for each of the sections sandwiched between two adjacent partial reflection units.

Although a frequency of occurrence is small, a tsunami may be used to calibrate the coefficient. Since a tsunami height in each sea area in offshore can be estimated from a tsunami height observed along a coast, the coefficient for each cable section can be obtained by calculating a ratio of the change in cable length before and after arrival of the tsunami in each cable section.

A tidal phenomenon and crustal deformation can be separated by differences in a speed of cable length changes. As described above, it is expected that a tidal phenomenon is as fast as daily, and crustal deformation is a change such as a very slow drift in a year unit. Reliability of a measurement result can be mutually improved by performing a data analysis in combination with an observation of crustal deformation by survey of the submarine reference station as described in Non-Patent Literature 1.

Since not only the crustal deformation but also the tidal phenomenon is a change being relatively slowly, a sufficient time margin performing averaging processing by performing the OTDR measurement many times, or intermittently performing the measurement operation itself can be ensured. However, when a tsunami is detected and used as an information source of an alarm, an algorithm for automatically detecting a tsunami immediately with a sufficiently short measurement interval is required. Both slow change phenomenon such as a tide and crustal deformation and fast change phenomenon such as a tsunami can be integrated into a single measurement system. For a phenomenon such as a tsunami that requires an immediate alarm notification, it is also effective to provide a mechanism for automatically detecting and notifying as immediately as possible by separately preparing a detection algorithm depending on a characteristic of the change of each phenomenon.

Other Example Embodiments

Note that the present invention is not limited to the aforementioned example embodiments and may be changed as appropriate without departing from the spirit of the present invention. For example, while the optical transmission path monitoring apparatus is applied to the undersea optical network system in the aforementioned example embodiments, this is merely one example. That is, the optical transmission path monitoring apparatus may be applied to a desired optical network system such as a land optical network system other than the undersea optical network system.

While the OTDR that uses Rayleigh scattering has been described in the aforementioned example embodiments, OTDR that uses a non-linear scattering phenomenon such as Brillouin scattering or Raman scattering may be applied. Since Brillouin scattering and Raman scattering tend to have smaller reflectances than that of Rayleigh scattering and it is relatively difficult to perform measurement for a long distance in Brillouin scattering and Raman scattering, the OTDR by Rayleigh scattering is preferably used.

It is needless to say that the aforementioned example embodiments may be combined as appropriate.

Further, as long as a desired reflectance can be achieved, another reflecting element such as an FBG other than the configuration illustrated in FIG. 2 may be used as the partial reflection unit.

In the aforementioned example embodiments, the number of partial reflection units provided in the optical fiber is merely one example and a desired number of partial reflection units may be provided in the optical fiber.

While an example in which the optical fiber cable is laid on the ground of the seabed has been described in the aforementioned example embodiments, in a place other than the sea where water is flooded, the optical fiber cable may be laid on the ground of the bottom of the place, and movement of the ground and a fluctuation of a water pressure may be detected. For example, an optical fiber cable may be laid on the ground at the bottom of a lake, a marsh, a river, and the like other than the sea, and movement of the ground and a fluctuation of a water pressure may be detected.

In the twelfth example embodiment, it has been described that an optical fiber cable is not only laid on the seabed surface but can also be buried in the ground under the seabed, but this is not limited to the twelfth example embodiment. That is, it is needless to say that, in the aforementioned example embodiment including the twelfth example embodiment, an optical fiber cable may be laid on the seabed surface or may be buried in the ground under the seabed.

The whole or part of the example embodiments disclosed above can be described as, but not limited to, the following supplementary notes.

(Supplementary Note 1) A water pressure fluctuation measuring system including: a cable that includes a first optical fiber and is provided on or in a ground of a seabed, in such a way that the first optical fiber is expanded and contracted according to a fluctuation of a water pressure; an optical output unit configured to output monitoring light to the first optical fiber; a partial reflection unit provided on a path of the first optical fiber in the cable and configured to partially reflect the monitoring light; an optical reception unit configured to receive reflection light reflected by the partial reflection unit; and a calculation unit configured to measure a length of the first optical fiber to the partial reflection unit, based on a round-trip propagation time of the received reflection light, and monitor a change in the length over time.

(Supplementary Note 2) The water pressure fluctuation measuring system according to Supplementary Note 1, in which an amount of change in the water pressure is acquired by multiplying an amount of change in a length of the first optical fiber by a coefficient, and the coefficient is acquired by dividing an amount of change in a water pressure between a high tide and a low tide in a sea area where the first optical fiber is installed, by an amount of change in a length of the first optical fiber between a high tide and a low tide.

(Supplementary Note 3) The water pressure fluctuation measuring system according to Supplementary Note 2, in which the optical output unit outputs the monitoring light at a first measurement timing and a second measurement timing being later than the first measurement timing, and the calculation unit monitors an amount of fluctuation in the water pressure, based on a difference between a length of the first optical fiber to the partial reflection unit being measured at the first measurement timing and a length of the first optical fiber to the partial reflection unit being measured at the second measurement timing.

(Supplementary Note 4) The water pressure fluctuation measuring system according to Supplementary Note 2 or 3, in which a plurality of the partial reflection units are provided at different points of the first optical fiber, and the calculation unit monitors a fluctuation of the water pressure, based on a fluctuation in a length of the first optical fiber between two of the plurality of partial reflection units.

(Supplementary Note 5) The water pressure fluctuation measuring system according to Supplementary Note 4, in which, for each cable section divided by the plurality of partial reflection units, the coefficient of each cable section is acquired from an amount of change in a water pressure between a high tide and a low tide of each cable section and an amount of change in a cable length of each cable section between a high tide and a low tide.

(Supplementary Note 6) The water pressure fluctuation measuring system according to Supplementary Note 4 or 5, in which the plurality of partial reflection units are formed in such a way that, the larger an optical loss in a path from the optical output unit to the partial reflection unit is, the higher a reflectance becomes.

(Supplementary Note 7) The water pressure fluctuation measuring system according to any one of Supplementary Notes 4 to 6, in which a fixing member for adding a grip force to the ground or in the ground is provided in the cable.

(Supplementary Note 8) The water pressure fluctuation measuring system according to Supplementary Note 7, in which the fixing member is provided in a vicinity of some or all of the plurality of partial reflection units.

(Supplementary Note 9) The water pressure fluctuation measuring system according to Supplementary Note 7 or 8, in which a mirror transponder to be used for echo ranging in a sea is fixed to the fixing member, the mirror transponder outputting a response acoustic signal upon receiving an acoustic signal.

(Supplementary Note 10) The water pressure fluctuation measuring system according to any one of Supplementary Notes 1 to 9, further including means for measuring a temperature of the first optical fiber in a longitudinal direction in a distributed manner, in which a change in a length of an optical fiber due to a change in the temperature over time is excluded from an amount of change in a length of the first optical fiber over time.

(Supplementary Note 11) The water pressure fluctuation measuring system according to Supplementary Note 10, in which another optical fiber included in a same cable as the first optical fiber is used for measurement of the temperature.

(Supplementary Note 12) The water pressure fluctuation measuring system according to any one of Supplementary Notes 1 to 11, further including a polarization scrambler configured to change a plane of polarization of the monitoring light in a pseudo-random manner before the monitoring light is made incident to the first optical fiber.

(Supplementary Note 13) The water pressure fluctuation measuring system according to any one of Supplementary Notes 1 to 12, in which the optical output unit, the optical reception unit, and the calculation unit constitute an Optical time domain reflectometer (OTDR) device.

(Supplementary Note 14) The water pressure fluctuation measuring system according to Supplementary Note 13, in which the OTDR device synchronizes an internal clock of the OTDR device with a clock signal being externally supplied.

(Supplementary Note 15) The water pressure fluctuation measuring system according to Supplementary Note 14, in which the clock signal being externally supplied is generated based on a signal received from a satellite of a satellite positioning system.

(Supplementary Note 16) The water pressure fluctuation measuring system according to any one of Supplementary Notes 1 to 12, further including: multiplexing/demultiplexing means; and a second optical fiber branched from the first optical fiber by the multiplexing/demultiplexing means, in which a partial reflection unit provided on a path of the second optical fiber and configured to partially reflect the monitoring light is provided.

(Supplementary Note 17) The water pressure fluctuation measuring system according to Supplementary Note 16, in which the multiplexing/demultiplexing means is an optical coupler that does not have wavelength selectivity.

(Supplementary Note 18) The water pressure fluctuation measuring system according to Supplementary Note 17, further including: a first OTDR device configured to output monitoring light of a first wavelength; and a second OTDR device configured to output monitoring light of a second wavelength, in which the multiplexing/demultiplexing means is an optical coupler having wavelength selectivity and configured to multiplex or demultiplex the first wavelength and the second wavelength.

(Supplementary Note 19) The water pressure fluctuation measuring system according to any one of Supplementary Notes 1 to 15, further including: an optical amplification repeater system including a third and a fourth optical fibers whose forward directions are opposite to each other, an optical amplification repeater configured to amplify light propagating through the third and the fourth optical fibers and relay the amplified light, and a path for branching a part of light that reaches the optical amplification repeater and propagates through the third optical fiber in a direction opposite to the forward direction and coupling the branched light to the fourth optical fiber; and an optical coupler being provided on a path of the third optical fiber, coupling the first optical fiber and the third optical fiber, and having wavelength selectivity with respect to light of a first wavelength, in which the optical output unit outputs monitoring light of the first wavelength in the forward direction of the third optical fiber, the monitoring light of the first wavelength is wavelength-selectively branched from the third optical fiber to the first optical fiber by the optical coupler, reflection light from the partial reflection unit provided in the first optical fiber is coupled to the third optical fiber by the optical coupler, propagates through the third optical fiber in a direction opposite to the forward direction of the third optical fiber, coupled to the fourth optical fiber by the path, and propagates through the fourth optical fiber in the forward direction of the fourth optical fiber, and the optical reception unit receives the reflection light from the partial reflection unit provided in the first optical fiber via the fourth optical fiber.

(Supplementary Note 20) The water pressure fluctuation measuring system according to any one of Supplementary Notes 13 to 15, further including: an optical amplification repeater system including a third and a fourth optical fibers whose forward directions are opposite to each other, an optical amplification repeater configured to amplify light propagating through the third and the fourth optical fibers and relay the amplified light, and a path for branching a part of light that reaches the optical amplification repeater and propagates through the third optical fiber in a direction opposite to the forward direction and coupling the branched light to the fourth optical fiber; a first communication apparatus connected to one end of each of the third and the fourth optical fibers, and configured to transmit a first optical signal having a third wavelength to the forward direction of the third optical fiber and receive a second optical signal having the third wavelength that propagates through the fourth optical fiber in the forward direction of the fourth optical fiber; a second communication apparatus including a first reception unit connected to the OTDR device and configured to receive the first optical signal, and a first transmission unit configured to transmit the second optical signal including a result acquired in the OTDR device; a first optical coupler provided on a path of the third optical fiber and configured to wavelength-selectively branch the first optical signal propagating through the third optical fiber in the forward direction of the third optical fiber to a first reception unit of the second communication apparatus; and a second optical coupler provided on a path of the fourth optical fiber and configured to wavelength-selectively couple the second optical signal being output from a first transmission unit of the second communication apparatus, to the fourth optical fiber in such a way that the second optical signal propagates through the fourth optical fiber in the forward direction of the fourth optical fiber.

(Supplementary Note 21) The water pressure fluctuation measuring system according to Supplementary Note 20, in which the first optical signal includes a clock signal generated by the first communication apparatus, based on a signal received from a satellite of a satellite positioning system, and a command for controlling the OTDR device, and the OTDR device synchronizes an internal clock of the OTDR device with the clock signal included in the first optical signal.

(Supplementary Note 22) The water pressure fluctuation measuring system according to Supplementary Note 20, further including: a third communication apparatus connected to another end of each of the third and the fourth optical fibers, and configured to transmit a third optical signal having the third wavelength to the forward direction of the fourth optical fiber and receive a fourth optical signal having the third wavelength that propagates through the third optical fiber in the forward direction of the third optical fiber; a third optical coupler provided on a path of the fourth optical fiber and configured to wavelength-selectively branch the third optical signal propagating through the fourth optical fiber in the forward direction of the fourth optical fiber to a second reception unit of the second communication apparatus; and a second optical coupler provided on a path of the third optical fiber and configured to wavelength-selectively couple the fourth optical signal being output from a second transmission unit of the second communication apparatus to the third optical fiber in such a way that the fourth optical signal propagates through the third optical fiber in the forward direction of the third optical fiber, in which, in the second communication apparatus, the second reception unit receives the third optical signal, and the second transmission unit transmits the fourth optical signal including a result acquired in the OTDR device.

(Supplementary Note 23) The water pressure fluctuation measuring system according to Supplementary Note 22, in which the second communication apparatus, the first to fourth optical couplers, and the OTDR device constitute an Optical add-drop multiplexer (OADM) branch node, an optical fiber cable including the third and the fourth optical fibers is connected from a first observation station where the first communication apparatus is provided to a second observation station including the third communication apparatus via an observation area in which the first optical fiber is laid, and the second communication apparatus communicates with the first observation station by the first and the second optical signals and communicates with the second observation station by the third and the fourth optical signals.

(Supplementary Note 24) The water pressure fluctuation measuring system according to Supplementary Note 19 or 20, in which the cable includes a sensor cable to be used for a purpose of measuring a fluctuation of a water pressure and a trunk cable to be used for a purpose of communication and power feeding, the first optical fiber is included in the sensor cable, and the sensor cable does not include a feed line conductor or includes a feed line conductor insulated from a power feeding line of the trunk cable.

(Supplementary Note 25) The water pressure fluctuation measuring system according to Supplementary Note 19 or 20, in which the cable includes a trunk cable to be used for a purpose of communication and power feeding and a branch cable to be branched from a trunk cable by an OADM branch node for measurement of a fluctuation of a water pressure, the branch cable includes a cable branched from the trunk cable connected to a sensor cable to be used for a purpose of measuring a fluctuation of a water pressure, the first optical fiber is included in the sensor cable, and the cable branched from the trunk cable does not include a feed line conductor or includes a feed line conductor insulated from a power feeding line of the trunk cable.

(Supplementary Note 26) The water pressure fluctuation measuring system according to Supplementary Note 25, in which a section of the branch cable being constituted of a cable branched from the trunk cable is formed by another end of a first part having one end connected to the OADM branch node and another end of a second part having one end connected to the sensor cable being connected to each other when the cable is laid on.

(Supplementary Note 27) The water pressure fluctuation measuring system according to Supplementary Note 26, in which a length of the first part is a length by which a connection point of the first part and the second part is separated from the OADM branch node in such a way that tension is not transmitted to the OADM branch node when the first part and the second part are connected to each other.

(Supplementary Note 28) The water pressure fluctuation measuring system according to Supplementary Note 26 or 27, in which the first part and the second part are installed in a place where a cable replacement work is performed, the cable replacement work including cable disconnection and reconnection by an anchor operation from a cable construction ship.

(Supplementary Note 29) The water pressure fluctuation measuring system according to any one of Supplementary Notes 13 to 15, in which a plurality of the OTDR devices are installed in a plurality of points of the first optical fiber via optical multiplexing/demultiplexing means, water pressure fluctuation measurement is conducted by using one of the plurality of OTDR devices and the other OTDR devices are used as auxiliary devices, and, when there is a failure in an optical fiber cable that connects the one OTDR device and the optical multiplexing/demultiplexing means associated with the one OTDR device, the water pressure fluctuation measurement is continued by using one of the auxiliary OTDR devices.

(Supplementary Note 30) A water pressure fluctuation measuring method including: providing a cable including a first optical fiber in which a partial reflection unit configured to partially reflect monitoring light is provided on a path, on or in a ground of a seabed in such a way that the first optical fiber is expanded and contracted according to a fluctuation of a water pressure; outputting the monitoring light to the first optical fiber; receiving reflection light reflected by the partial reflection unit; and measuring a length of the first optical fiber to the partial reflection unit, based on a round-trip propagation time of the received reflection light, and monitoring a change in the length over time.

(Supplementary Note 31) The water pressure fluctuation measuring method according to Supplementary Note 30, in which an amount of change in the water pressure is acquired by multiplying an amount of change in a length of the first optical fiber by a coefficient, and the coefficient is acquired by dividing an amount of change in a water pressure between a high tide and a low tide in a sea area where the first optical fiber is installed, by an amount of change in a length of the first optical fiber between a high tide and a low tide.

(Supplementary Note 32) The water pressure fluctuation measuring method according to Supplementary Note 31, further including: outputting the monitoring light at a first measurement timing and a second measurement timing later than the first measurement timing; and monitoring an amount of a fluctuation of the water pressure, based on a difference between a length of the first optical fiber to the partial reflection unit being measured at the first measurement timing and a length of the first optical fiber to the partial reflection unit being measured at the second measurement timing.

(Supplementary Note 33) The water pressure fluctuation measuring method according to Supplementary Note 31 or 32, in which a plurality of the partial reflection units are provided at different points of the first optical fiber, and a fluctuation of the water pressure is monitored based on a fluctuation in a length of the first optical fiber between two of the plurality of partial reflection units.

(Supplementary Note 34) The water pressure fluctuation measuring method according to Supplementary Note 33, further including, for each cable section divided by the plurality of partial reflection sections, acquiring the coefficient of each cable section from an amount of change in a water pressure between a high tide and a low tide of each cable section and an amount of change in a cable length of each cable section between a high tide and a low tide.

(Supplementary Note 35) The water pressure fluctuation measuring method according to Supplementary Note 33 or 34, in which the plurality of partial reflection units are formed in such a way that, the larger an optical loss in a path from a source that outputs the monitoring light to the partial reflection unit is, the higher a reflectance becomes.

(Supplementary Note 36) The water pressure fluctuation measuring method according to any one of Supplementary Notes 33 to 35, in which a fixing member for adding a grip force to the ground or in the ground is provided in the cable.

(Supplementary Note 37) The water pressure fluctuation measuring method according to Supplementary Note 36, in which the fixing member is provided in a vicinity of some or all of the plurality of partial reflection units.

(Supplementary Note 38) The water pressure fluctuation measuring method according to Supplementary Note 36 or 37, in which a mirror transponder to be used for echo ranging in a sea is fixed to the fixing member, the mirror transponder outputting a response acoustic signal upon receiving an acoustic signal.

(Supplementary Note 39) The water pressure fluctuation measuring method according to any one of Supplementary Notes 30 to 38, further including: measuring a temperature of the first optical fiber in a longitudinal direction in a distributed manner; and excluding a change in a length of an optical fiber due to a change in the temperature over time from an amount of change in a length of the first optical fiber over time.

(Supplementary Note 40) The water pressure fluctuation measuring method according to Supplementary Note 39, in which another optical fiber included in a same cable as the first optical fiber is used for measurement of the temperature.

(Supplementary Note 41) The water pressure fluctuation measuring method according to any one of Supplementary Notes 30 to 40, further including changing a plane of polarization of the monitoring light in a pseudo-random manner before inputting the monitoring light to the first optical fiber.

(Supplementary Note 42) The water pressure fluctuation measuring method according to any one of Supplementary Notes 30 to 41, in which an optical output unit configured to output the monitoring light, an optical reception unit configured to receive the reflection light, and a calculation unit configured to measure a length of the first optical fiber to the partial reflection unit and monitor a change in the length over time constitute an Optical time domain reflectometer (OTDR) device.

(Supplementary Note 43) The water pressure fluctuation measuring method according to Supplementary Note 42, in which the OTDR device synchronizes an internal clock of the OTDR device with a clock signal being externally supplied.

(Supplementary Note 44) The water pressure fluctuation measuring method according to Supplementary Note 43, in which the clock signal being externally supplied is generated based on a signal received from a satellite of a satellite positioning system.

(Supplementary Note 45) The water pressure fluctuation measuring method according to any one of Supplementary Notes 30 to 41, in which a second optical fiber is branched from the first optical fiber by multiplexing/demultiplexing means, and a partial reflection unit configured to partially reflect the monitoring light is provided on a path of the second optical fiber.

(Supplementary Note 46) The water pressure fluctuation measuring method according to Supplementary Note 45, in which the multiplexing/demultiplexing means is an optical coupler that does not have wavelength selectivity.

(Supplementary Note 47) The water pressure fluctuation measuring method according to Supplementary Note 46, in which a first OTDR device outputs monitoring light of a first wavelength, a second OTDR device outputs monitoring light of a second wavelength, and the multiplexing/demultiplexing means is an optical coupler having wavelength selectivity and configured to multiplex or demultiplex the first wavelength and the second wavelength.

(Supplementary Note 48) The water pressure fluctuation measuring method according to any one of Supplementary Notes 30 to 44, further including: providing an optical amplification repeater system including a third and a fourth optical fibers whose forward directions are opposite to each other, an optical amplification repeater configured to amplify light propagating through the third and the fourth optical fibers and relay the amplified light, and a path for branching a part of light that reaches the optical amplification repeater and propagates through the third optical fiber in a direction opposite to the forward direction and coupling the branched light to the fourth optical fiber; providing an optical coupler having wavelength selectivity with respect to light of a first wavelength, the optical coupler being provided on a path of the third optical fiber and coupling the first optical fiber and the third optical fiber; outputting monitoring light of the first wavelength in the forward direction of the third optical fiber, in which the monitoring light of the first wavelength is wavelength-selectively branched from the third optical fiber to the first optical fiber by the optical coupler, reflection light from the partial reflection unit provided in the first optical fiber is coupled to the third optical fiber by the optical coupler, propagates through the third optical fiber in a direction opposite to the forward direction, coupled to the fourth optical fiber by the path, and propagates through the fourth optical fiber in the forward direction of the fourth optical fiber, and the reflection light from the partial reflection unit provided in the first optical fiber is received via the fourth optical fiber.

(Supplementary Note 49) The water pressure fluctuation measuring method according to any one of Supplementary Notes 42 to 44, further including: providing an optical amplification repeater system including a third and a fourth optical fibers whose forward directions are opposite to each other, an optical amplification repeater configured to amplify light propagating through the third and the fourth optical fibers and relay the amplified light, and a path for branching a part of light that reaches the optical amplification repeater and propagates through the third optical fiber in a direction opposite to the forward direction and coupling the branched light to the fourth optical fiber; providing a first communication apparatus connected to one end of each of the third and the fourth optical fibers, and configured to transmit a first optical signal having a third wavelength to the forward direction of the third optical fiber and receive a second optical signal having the third wavelength that propagates through the fourth optical fiber in the forward direction of the fourth optical fiber; providing a second communication apparatus including a first reception unit connected to the OTDR device and configured to receive the first optical signal, and a first transmission unit configured to transmit the second optical signal including a result acquired in the OTDR device; providing a first optical coupler provided on a path of the third optical fiber and configured to wavelength-selectively branch the first optical signal propagating through the third optical fiber in the forward direction of the third optical fiber to a first reception unit of the second communication apparatus; and providing a second optical coupler provided on a path of the fourth optical fiber and configured to wavelength-selectively couple the second optical signal being output from a first transmission unit of the second communication apparatus to the fourth optical fiber in such a way that the second optical signal propagates through the fourth optical fiber in the forward direction of the fourth optical fiber.

(Supplementary Note 50) The water pressure fluctuation measuring method according to Supplementary Note 49, in which the first optical signal includes a clock signal generated by the first communication apparatus, based on a signal received from a satellite of a satellite positioning system, and a command for controlling the OTDR device, and an internal clock of the OTDR device is synchronized with the clock signal included in the first optical signal.

(Supplementary Note 51) The water pressure fluctuation measuring method according to Supplementary Note 49, further including: providing a third communication apparatus connected to another end of each of the third and the fourth optical fibers, and configured to transmit a third optical signal having the third wavelength to the forward direction of the fourth optical fiber and receive a fourth optical signal having the third wavelength that propagates through the third optical fiber in the forward direction of the third optical fiber; providing a third optical coupler provided on a path of the fourth optical fiber and configured to wavelength-selectively branch the third optical signal propagating through the fourth optical fiber in the forward direction of the fourth optical fiber to a second reception unit of the second communication apparatus; providing a second optical coupler provided on a path of the third optical fiber and configured to wavelength-selectively couple the fourth optical signal being output from a second transmission unit of the second communication apparatus to the third optical fiber in such a way that the fourth optical signal propagates through the third optical fiber in the forward direction of the third optical fiber, in which, in the second communication apparatus, the second reception unit receives the third optical signal and the second transmission unit transmits the fourth optical signal including a result acquired in the OTDR device.

(Supplementary Note 52) The water pressure fluctuation measuring method according to Supplementary Note 51, in which the second communication apparatus, the first to fourth optical couplers, and the OTDR device constitute an Optical add-drop multiplexer (OADM) branch node, an optical fiber cable including the third and the fourth optical fibers is connected from a first observation station where the first communication apparatus is provided to a second observation station including the third communication apparatus via an observation area in which the first optical fiber is laid, and the second communication apparatus communicates with the first observation station by the first and the second optical signals and communicates with the second observation station by the third and the fourth optical signals.

(Supplementary Note 53) The water pressure fluctuation measuring method according to Supplementary Note 47 or 48, in which the cable includes a sensor cable to be used for a purpose of measuring a fluctuation of a water pressure and a trunk cable to be used for a purpose of communication and power feeding, the first optical fiber is included in the sensor cable, and the sensor cable does not include a feed line conductor or includes a feed line conductor insulated from a power feeding line of the trunk cable.

(Supplementary Note 54) The water pressure fluctuation measuring method according to Supplementary Note 47 or 48, in which the cable includes a trunk cable to be used for a purpose of communication and power feeding and a branch cable to be branched from a trunk cable by an OADM branch node for measurement of a fluctuation of a water pressure, the branch cable includes a cable branched from the trunk cable being connected to a sensor cable to be used for a purpose of measuring a fluctuation of a water pressure, the first optical fiber is included in the sensor cable, and the cable branched from the trunk cable does not include a feed line conductor or includes a feed line conductor insulated from a power feeding line of the trunk cable.

(Supplementary Note 55) The water pressure fluctuation measuring method according to Supplementary Note 54, in which a section of the branch cable being constituted of a cable branched from the trunk cable is formed by another end of a first part having one end connected to the OADM branch node and another end of a second part having one end connected to the sensor cable being connected to each other when the cable is laid on.

(Supplementary Note 56) The water pressure fluctuation measuring method according to Supplementary Note 55, in which a length of the first part is a length by which a connection point of the first part and the second part is separated from the OADM branch node in such a way that tension is not transmitted to the OADM branch node when the first part and the second part are connected to each other.

(Supplementary Note 57) The water pressure fluctuation measuring method according to Supplementary Note 55 or 56, in which the first part and the second part are installed in a place where a cable replacement work is performed, the cable replacement work including cable disconnection and reconnection by an anchor operation from a cable construction ship.

(Supplementary Note 58) The water pressure fluctuation measuring method according to any one of Supplementary Notes 42 to 44, in which a plurality of the OTDR devices are installed in a plurality of points of the first optical fiber via optical multiplexing/demultiplexing means, water pressure fluctuation measurement is conducted by using one of the plurality of OTDR devices and the other OTDR devices are used as auxiliary devices, and, when there is a failure in an optical fiber cable that connects the one OTDR device and the optical multiplexing/demultiplexing means associated with the one OTDR device, the water pressure fluctuation measurement is continued by using one of the auxiliary OTDR devices.

While the present invention has been described with reference to the example embodiment, the present invention is not limited to the above example embodiment. Various changes that may be understood by those skilled in the art may be made to the configurations and the details of the present application.

This application is based upon and claims the benefit of priority from Japanese Patent Application No. 2020-18851, filed on Feb. 6, 2020, the disclosure of which is incorporated herein in its entirety by reference.

REFERENCE SIGNS LIST

A1-A4 Fixing member
AR, AT Optical amplifier
AU Optical amplification repeater
C0-C4, C11, C12, C21, C22 Optical coupler
CLK Clock
DAT1 OTDR output data
DAT2 DTS output data
F1-F5 Optical fiber cable (Optical fiber)
FA, FR, FT, F61-F64 Optical fiber
FP Fiber pair
P Return path of reflection light from transmission path
R11-R14, R21-R23, R31, R32, R41, R42, R51, R52, Rxx Partial reflection unit
Rx RECEIVER
TX TRANSMITTER
TPD1, TPD2, TPD4 MIRROR TRANSPONDER
SL POWER FEEDING CONDUCTOR
WC, WC1, WC2 WDM COUPLER
WC0 WAVELENGTH DEMULTIPLEXER
1, 10-13 OTDR DEVICE
1A OPTICAL OUTPUT UNIT
1B OPTICAL RECEPTION UNIT
1C CALCULATION UNIT
2 OPTICAL COUPLER
3 OPTICAL ATTENUATION ELEMENT
4 TOTAL REFLECTION ELEMENT
100, 200, 201, 300, 400, 500, 501, 600-603, 630, 700, 800 SURVEYING SYSTEM
310 SEABED SURFACE
611, 614 COMMUNICATION APPARATUS
612 WAVELENGTH MULTIPLEXER
613 WAVELENGTH SEPARATOR
615 COMMUNICATION CONTROL UNIT
616 POWER FEEDING UNIT
618, 618A, 619, 631-634, 902, 905 OADM BRANCH NODE
620 TRUNK CABLE
621, 622, 710 LAND STATION
640 DATA COMMUNICATION NETWORK
701 DTS DEVICE
702 DATA PROCESSING APPARATUS
703 POLARIZATION SCRAMBLER
704 HIGH-PRECISION CLOCK SUPPLY UNIT
720 CABLE
801 SHIP
802 GNSS SATELLITE
820 SEA SURFACE
900 TRUNK CABLE
920, 950 BRANCH CABLE
921, 951 TRUNK SPECIFICATION CABLE TYPE SECTION
922, 952 REPLACEMENT REPAIR WORK ASSUMED AREA
923, 953 CABLE
925, 945, 955 SENSOR SPECIFICATION CABLE TYPE SECTION
956 CONNECTION POINT

What is claimed is:

1. A water pressure fluctuation measuring system comprising:
a cable that includes a first optical fiber and is provided on or in a ground of a seabed, in such a way that the first optical fiber is expanded and contracted according to a fluctuation of a water pressure;
an optical output unit configured to output monitoring light to the first optical fiber;
a partial reflection unit provided on a path of the first optical fiber in the cable and configured to partially reflect the monitoring light;
an optical reception unit configured to receive reflection light reflected by the partial reflection unit; and
a calculation unit configured to measure a length of the first optical fiber to the partial reflection unit, based on a round-trip propagation time of the received reflection light, and monitor a change in the length over time, wherein
an amount of change in the water pressure is acquired by multiplying an amount of change in a length of the first optical fiber by a coefficient,
the coefficient is acquired by dividing an amount of change in a water pressure between a high tide and a low tide in a sea area where the first optical fiber is installed, by an amount of change in a length of the first optical fiber between a high tide and a low tide,
a plurality of the partial reflection units is provided at different points of the first optical fiber,
the calculation unit monitors a fluctuation of the water pressure, based on a fluctuation in a length of the first optical fiber between two of the plurality of partial reflection units,
a fixing member for adding a grip force to the ground or in the ground is provided in the cable, and
a mirror transponder to be used for echo ranging in a sea is fixed to the fixing member, the mirror transponder outputting a response acoustic signal upon receiving an acoustic signal.

2. The water pressure fluctuation measuring system according to claim 1, wherein
the optical output unit outputs the monitoring light at a first measurement timing and a second measurement timing being later than the first measurement timing, and
the calculation unit monitors an amount of fluctuation in the water pressure, based on a difference between a length of the first optical fiber to the partial reflection unit being measured at the first measurement timing and a length of the first optical fiber to the partial reflection unit being measured at the second measurement timing.

3. The water pressure fluctuation measuring system according to claim 1, wherein, for each cable section divided by the plurality of partial reflection units, the coefficient of each cable section is acquired from an amount of change in a water pressure between a high tide and a low tide of each cable section and an amount of change in a cable length of each cable section between a high tide and a low tide.

4. The water pressure fluctuation measuring system according to claim 1, wherein the plurality of partial reflection units is formed in such a way that, the larger an optical loss in a path from the optical output unit to the partial reflection unit is, the higher a reflectance becomes.

5. The water pressure fluctuation measuring system according to claim 1, wherein the fixing member is provided in a vicinity of some or all of the plurality of partial reflection units.

6. The water pressure fluctuation measuring system according to claim 1, further comprising a sensor configured to measure a temperature of the first optical fiber in a longitudinal direction in a distributed manner,
wherein a change in a length of an optical fiber due to a change in the temperature over time is excluded from an amount of change in a length of the first optical fiber over time.

7. The water pressure fluctuation measuring system according to claim 6, wherein another optical fiber included in a same cable as the first optical fiber is used for measurement of the temperature.

8. The water pressure fluctuation measuring system according to claim 1, further comprising a polarization scrambler configured to change a plane of polarization of the monitoring light in a pseudo-random manner before the monitoring light is made incident to the first optical fiber.

9. The water pressure fluctuation measuring system according to claim 1, wherein the optical output unit, the optical reception unit, and the calculation unit constitute an Optical time domain reflectometer (OTDR) device.

10. The water pressure fluctuation measuring system according to claim 9, wherein the OTDR device synchronizes an internal clock of the OTDR device with a clock signal being externally supplied.

11. The water pressure fluctuation measuring system according to claim 10, wherein the clock signal being externally supplied is generated based on a signal received from a satellite of a satellite positioning system.

12. The water pressure fluctuation measuring system according claim 1, further comprising:
a multiplexer/demultiplexer; and
a second optical fiber branched from the first optical fiber by the multiplexer/demultiplexer,
wherein a partial reflection unit provided on a path of the second optical fiber and configured to partially reflect the monitoring light is provided.

13. The water pressure fluctuation measuring system according to claim 12, wherein the multiplexer/demultiplexer is an optical coupler that does not have wavelength selectivity.

14. The water pressure fluctuation measuring system according to claim 13, further comprising:
a first OTDR device configured to output monitoring light of a first wavelength; and
a second OTDR device configured to output monitoring light of a second wavelength,
wherein the multiplexer/demultiplexer is an optical coupler having wavelength selectivity and configured to multiplex or demultiplex the first wavelength and the second wavelength.

15. A water pressure fluctuation measuring system comprising:
a cable that includes a first optical fiber and is provided on or in a ground of a seabed, in such a way that the first optical fiber is expanded and contracted according to a fluctuation of a water pressure;
an optical output unit configured to output monitoring light to the first optical fiber;
a partial reflection unit provided on a path of the first optical fiber in the cable and configured to partially reflect the monitoring light;
an optical reception unit configured to receive reflection light reflected by the partial reflection unit;
a calculation unit configured to measure a length of the first optical fiber to the partial reflection unit, based on a round-trip propagation time of the received reflection light, and monitor a change in the length over time; and
an optical amplification repeater system including
a third and a fourth optical fibers whose forward directions are opposite to each other,
an optical amplification repeater configured to amplify light propagating through the third and the fourth optical fibers and relay the amplified light, and
a path for branching a part of light that reaches the optical amplification repeater and propagates through the third optical fiber in a direction opposite to the forward direction and coupling the branched light to the fourth optical fiber; and
an optical coupler being provided on a path of the third optical fiber, coupling the first optical fiber and the third optical fiber, and having wavelength selectivity with respect to light of a first wavelength, wherein
the optical output unit outputs monitoring light of the first wavelength in the forward direction of the third optical fiber,
the monitoring light of the first wavelength is wavelength-selectively branched from the third optical fiber to the first optical fiber by the optical coupler, reflection light from the partial reflection unit provided in the first optical fiber is coupled to the third optical fiber by the optical coupler, propagates through the third optical fiber in a direction opposite to the forward direction of the third optical fiber, coupled to the fourth optical fiber by the path, and propagates through the fourth optical fiber in the forward direction of the fourth optical fiber, and the optical reception unit receives the reflection light from the partial reflection unit provided in the first optical fiber via the fourth optical fiber.

16. A water pressure fluctuation measuring method comprising:

providing a cable including a first optical fiber in which a partial reflection unit configured to partially reflect monitoring light is provided on a path, on or in a ground of a seabed in such a way that the first optical fiber is expanded and contracted according to a fluctuation of a water pressure;

providing a plurality of the partial reflection units at different points of the first optical fiber;

providing a fixing member for adding a grip force to the ground or in the ground in the cable;

fixing a mirror transponder to be used for echo ranging in a sea to the fixing member, the mirror transponder outputting a response acoustic signal upon receiving an acoustic signal;

outputting the monitoring light to the first optical fiber;

receiving reflection light reflected by the partial reflection unit; and measuring a length of the first optical fiber to the partial reflection unit, based on a round-trip propagation time of the received reflection light, and monitoring a change in the length over time, wherein an amount of change in the water pressure is acquired by multiplying an amount of change in a length of the first optical fiber by a coefficient, the coefficient is acquired by dividing an amount of change in a water pressure between a high tide and a low tide in a sea area where the first optical fiber is installed, by an amount of change in a length of the first optical fiber between a high tide and a low tide, a fluctuation of the water pressure is monitored based on a fluctuation in a length of the first optical fiber between two of the plurality of partial reflection units.

* * * * *